(12) United States Patent (10) Patent No.: US 6,754,470 B2
Hendrickson et al. (45) Date of Patent: *Jun. 22, 2004

(54) SYSTEM AND METHOD FOR MEASURING WIRELESS DEVICE AND NETWORK USAGE AND PERFORMANCE METRICS

(75) Inventors: Keith Hendrickson, Carlsbad, CA (US); William Maguy, San Francisco, CA (US); Paul Prehn, Walnut Creek, CA (US); Nick Stamos, San Francisco, CA (US); Annie Su, San Francisco, CA (US)

(73) Assignee: Telephia, Inc., San Francisco, CA (US)

( * ) Notice: Subject to any disclaimer, the term of this patent is extended or adjusted under 35 U.S.C. 154(b) by 187 days.

This patent is subject to a terminal disclaimer.

(21) Appl. No.: 09/944,843

(22) Filed: Aug. 31, 2001

(65) Prior Publication Data

US 2002/0069037 A1 Jun. 6, 2002

Related U.S. Application Data

(63) Continuation-in-part of application No. 09/654,486, filed on Sep. 1, 2000.

(51) Int. Cl.[7] .............................................. H04B 17/00
(52) U.S. Cl. .................. 455/67.11; 455/405; 455/456.1
(58) Field of Search .................................. 455/423, 424, 455/425, 67.11, 67.13, 67.7, 456.1, 63.1, 405, 456.3, 456.6, 406; 702/1, 127; 709/224, 223; 705/63

(56) References Cited

U.S. PATENT DOCUMENTS

| | | | |
|---|---|---|---|
| 5,675,510 A | | 10/1997 | Coffey et al. |
| 5,987,306 A | * | 11/1999 | Nilsen et al. ............. 455/67.11 |
| 6,115,680 A | | 9/2000 | Coffee et al. |
| 6,138,147 A | | 10/2000 | Weaver et al. |
| 6,397,256 B1 | * | 5/2002 | Chan et al. .................. 709/229 |
| 6,405,251 B1 | * | 6/2002 | Bullard et al. ............... 709/224 |
| 6,470,386 B1 | * | 10/2002 | Combar et al. ............. 709/224 |
| 2002/0025795 A1 | * | 2/2002 | Sharon et al. ............... 455/405 |

* cited by examiner

*Primary Examiner*—Quochien B. Vuong
(74) *Attorney, Agent, or Firm*—Morrison & Foerster LLP

(57) ABSTRACT

Systems and methods for measuring wireless device and wireless network usage and performance metrics are set forth. The system includes at least one wireless device, and data gathering software installed on the wireless device for collecting device parametric data, network parametric data, event data. A control center may receive, store and process said device parametric data, network parametric data, and event data.

31 Claims, 19 Drawing Sheets

FIG. 3

| | FIG._3A |
|---|---|
| | FIG._3B |

FIG. 3A

| Origination Point | Channel | Message Title | Message Content |
|---|---|---|---|
| Base Station | Access | Overhead Information Substrate | General Page Messages |
| Base Station | Access | Overhead Information Substrate | Page Messages |
| Base Station | Access | Overhead Information Substrate | Slotted Page Messages |
| Handset | Access | Mobile Station Order/ Message Response Substrate | Received Messages Order Acknowledgment/Response |
| Handset/Base Station | Access | Registration Substrate | Authentication Challenge Message |
| Handset/Base Station | Access | Registration Substrate | Base Station Challenge Confirmation Order |

| Origination Point | Channel | Message Title | Message Content |
|---|---|---|---|
| Handset/Base Station | Paging | Paging Channel Substrate | Any Message |
| Handset/Base Station | Paging | Paging Channel Substrate | Abbreviated Alert Order |
| Handset/Base Station | Paging | Paging Channel Substrate | Audit Order |
| Handset/Base Station | Paging | Paging Channel Substrate | Authentication Challenge Message |
| Handset/Base Station | Paging | Paging Channel Substrate | Base Station Acknowledgment Order |
| Handset/Base Station | Paging | Paging Channel Substrate | Base Station Challenge Confirmation Order |
| Handset/Base Station | Paging | Paging Channel Substrate | Channel Assignment Message |
| Handset/Base Station | Paging | Paging Channel Substrate | Data Burst Message |

| Origination Point | Channel | Message Title | Message Content |
|---|---|---|---|
| Base Station | Forward Link | Forward Channel Substrate | Systems Parameters Messages |
| Base Station | Forward Link | Forward Channel Substrate | Access Parameters Message |
| Base Station | Forward Link | Forward Channel Substrate | Neighbor List Message |
| Base Station | Forward Link | Forward Channel Substrate | CDMA Channel List Message |
| Base Station | Forward Link | Forward Channel Substrate | Extended System Parameters Message |
| Base Station | Forward Link | Forward Channel Substrate | Global Service Redirection Message |
| Base Station | Forward Link | Forward Channel Substrate | Abbreviated Alert Order |
| Base Station | Forward Link | Forward Channel Substrate | Audit Order |

| Origination Point | Channel | Message Title | Message Content |
|---|---|---|---|
| Handset | Reverse Link | Reverse Channel Substrate | Systems Parameters Messages |
| Handset | Reverse Link | Reverse Channel Substrate | Access Parameters Message |
| Handset | Reverse Link | Reverse Channel Substrate | Neighbor List Message |
| Handset | Reverse Link | Reverse Channel Substrate | CDMA Channel List Message |
| Handset | Reverse Link | Reverse Channel Substrate | Extended System Parameters Message |
| Handset | Reverse Link | Reverse Channel Substrate | Global Service Redirection Message |
| Handset | Reverse Link | Reverse Channel Substrate | Abbreviated Alert Order |
| Handset | Reverse Link | Reverse Channel Substrate | Audit Order |

*FIG. 3B*

| Item | Definition |
|---|---|
| min1_accolc | access overload class for each MIN in the given NAM |
| air_timer | air timer for the given NAM |
| analog_first_chp | first analog channel given for that NAM |
| analong_hone_sid | analog home system ID for the given NAM |
| analog_pref_serv | analog preferred service system |
| analog_reg | analog_registration setting |
| analog_sid_acq | analog SID acquisition list |
| analog_sid_lock | analog SID lockout list |
| auto_answer | auto answer setting |
| auto_hyphen | auto hyphen setting |
| auto_lock | auto lock setting |
| auto_mute | auto radio mute setting |
| auto_nam | auto select NAM |
| auto_power | auto power off |
| auto_redial | auto redial setting |
| a_key | authentication key |
| a_key_chksum | authentication check sum |
| back_light | back light |
| banner | current banner |
| beep_lvl | key beep volume level |
| call_fade_alert | call fade alert select |
| call_rest | call restrictions |
| call_timer | last call time for a given NAM |
| cdma_pn_mask | short code pn offset mask choice |
| cdma_pref_serv | cdma pref serv |
| cdma_rx_pwr | CDMA receive power |
| cdma_tx_pwr | CDMA Transmit power |
| cdma_sid_acq | cdma sid acquisition list for a given NAM |
| data_idle_timeout | data service idle time in seconds |
| data_io_mode | external data port mode |
| data_srvc_state | data service enabled/disabled |
| dist_reg | distance based registration values |
| ear_lvl | handset earpiece volume level |
| err_log | adds entry to the on board error log |
| esn | electronic serial number |
| esn_chksum | checksum for the electronic serial number |
| fm_rssi | FM relative signal strength |
| fm_tx_pwr | FM transmit power |
| fr_temp_offset | frequent offset temp values |
| life_timer | lifetime {non-resetable} cumulative call timer |
| locaid | analog location area ID |
| lstsid | last SID registered |
| ppcnch | primary PCN channel for the given NAM |
| pref_mode | mode preference |
| pureg | analog power up registration identifier |

*FIG. 4*

| Basic Phone Functions | | | |
|---|---|---|---|
| Event Type — 510 | Metrics — 520 | MSM Location — 530 | |
| Power Up | TD-LL (Time, Date, Long-Lat) | GPIB Interface<br>GPS Processor | |
| Power Down | TD-LL | GPIB Interface<br>GPS Processor | |
| Phone Mode - Acquisition | TD-LL<br>Roaming Indicator<br>*Acq state can interleave between any state | Mode Select Interface<br>Phase Lock Loop<br>RF Interface<br>CDMA Processor<br>GPS Processor | *Mode Select Interface Most Recently Used (MRU) Acquisition Table<br>System Table |
| Phone Mode - Dig 800 | TD-LL | Mode Select Interface<br>Phase Lock Loop<br>RF Interface<br>CDMA Processor<br>GPS Processor | |
| Phone Mode - Dig 1.9G | TD-LL | Mode Select Interface<br>Phase Lock Loop<br>RF Interface<br>CDMA Processor<br>GPS Processor | |
| Phone Mode - Analog | TD-LL | Mode Select Interface<br>Phase Lock Loop<br>RF Interface<br>CDMA Processor<br>GPS Processor | |
| Phone Mode - No Service | TD-LL | Mode Select Interface<br>Phase Lock Loop<br>RF Interface<br>CDMA Processor<br>GPS Processor | |
| External Power Applied | TD-LL<br>Voltage<br>Temp Battery<br>Charge State | Charging System<br>GPS Processor | |
| External Power Applied - Charging Complete | TD-LL<br>Voltage<br>Temp Battery<br>Charge State | Charging System<br>GPS Processor | |
| External Power Removed | TD-LL<br>Voltage<br>Temp Battery | Charging System<br>GPS Processor | |

FIG. 5A

| Voice Call Events | | | |
|---|---|---|---|
| | | | |
| Event Type | Metrics | MSM Location | |
| Land-side Voice Call | TD-LL | CDMA Processor<br>GPS Processor | |
| Land-side Voice Call Connect | TD-LL<br>Vocoder (8, 13, 8EVRC)<br>Transmit Power (Tx)<br>Receive Power (Rx)<br>Frame Errasure Rate(FER) | CDMA Processor<br>GPS Processor | |
| Land-side Voice Call Blocked | TD-LL | CDMA Processor<br>GPS Processor | |
| Land-side Voice Call End | TD-LL<br>Mobile Terminated<br>Land-side Terminated<br>Dropped | CDMA Processor<br>GPS Processor | |
| Mobile Voice Call Origination | TD-LL<br>MIN Dialed | CDMA Processor<br>GPS Processor | |
| Mobile Voice Call Connect | TD-LL<br>MIN Dialed<br>Vocoder (8, 13, 8EVRC)<br>Transmit Power (Tx)<br>Receive Power (Rx)<br>Frame Errasure Rate(FER) | CDMA Processor<br>GPS Processor | |
| Mobile Voice Call Blocked | TD-LL<br>MIN Dialed | CDMA Processor<br>GPS Processor | |
| Mobile Voice Call End | TD-LL<br>Mobile Terminated<br>Land-side Terminated<br>Dropped | CDMA Processor<br>GPS Processor | |
| | | | |
| M-Advertising | | | |
| | | | |
| Event Type | Metrics | MSM Location | |
| Ad Displayed | TD-LL<br>UPID<br>Ad ID | Browser<br>GPS Processor | |
| Ad Selected | TD-LL<br>UPID<br>Ad ID | Browser<br>GPS Processor | |

*FIG. 5B*

| Browser Call Events | | | |
|---|---|---|---|
| Event Type | Metrics | MSM Location | |
| Mobile Browser Launch | TD-LL | Browser<br>GPS Processor | |
| Mobile Browser Call Origination | TD-LL | Browser<br>GPS Processor | |
| Mobile Browser Call Connect | TD-LL<br>Transmit Power (Tx)<br>Receive Power (Rx)<br>UPID (unique page indentifier - IP, URL, Card ID)<br>Deck Byte Size | Browser<br>GPS Processor | |
| Mobile Browser Call Blocked | TD-LL | Browser<br>GPS Processor | |
| Deck (URL) Request - Operator Server (inside portal) | TD-LL<br>UPID | Browser<br>GPS Processor | |
| Deck (URL) Request - External Server (outside portal) | TD-LL<br>UPID | Browser<br>GPS Processor | |
| Deck (URL) Received - Success | TD-LL<br>UPID<br>Deck Byte Size | Browser<br>GPS Processor | |
| Deck (URL) Received - Error | TD-LL<br>UPID | Browser<br>GPS Processor | |
| Card Select | TD-LL<br>UPID | Browser<br>GPS Processor | |
| Mobile Browser Call Termination | TD-LL<br>Mobile Termination<br>Dropped | Browser<br>CDMA Processor<br>GPS Processor | |

*FIG. 5C*

| M-Commerce | | | |
|---|---|---|---|
| | | | |
| Event Type | Metrics | MSM Location | |
| Product Selection | TD-LL<br>UPID<br>UPC (or equivalent)<br>Price | Browser<br>GPS Processor | |
| Purchase Confirmation | TD-LL<br>UPID | Browser<br>GPS Processor | |
| | | | |
| SMS Messaging | | | |
| | | | |
| Event Type | Metrics | MSM Location | |
| SMS Message Received | TD-LL<br>Byte Size | CDMA Processor<br>GPS Processor | |
| SMS Message Sent | TD-LL<br>Byte Size | CDMA Processor<br>GPS Processor | |

*FIG. 5D*

Data and Voice {example}

(1) ⟵ 710

06/20/2000 23:20:00.450 [15] ACCESS CAI
Origination Message
 ack_seq 7, msg_seq 7, ack_req
1, valid_ack 0, ack_type 0
 esn 0xB334C545
 imsi {0,0}
imsi_s=1308392c2= (415) 637-4817
 auth_mode 0
 mob_term 1
 slot_cycle_index 2
 mob_p_rev 1
 scm 0xa0
 request_mode 3  ⟵ 730
 special_service 0
{0=data, 1=voice}
 service_option 0x8000
 digit_mode 0
 more_fields 0
 num_fields 7
 chari[ ]: 2641797

(2) ⟵ 720

06/20/2000 23:21:00.000 [15] ACCESS CAI
Origination Message
 ack_seq 7, msg_seq 7, ack_req
1, valid_ack 0, ack_type 0
 esn 0xB334C545
 imsi {0,0}
imsi_s=1308392c2= (415) 637-4817
 auth_mode 0
 mob_term 1
 slot_cycle_index 2
 mob_p_rev 1
 scm 0xa0
 request_mode 3  ⟵ 730
 special_service 1
{0=data, 1=voice}
 service_option 0x8000
 digit_mode 0
 more_fields 0
 num_fields 7
 chari[ ]: 2641797

*FIG. 7*

Site Measurements

| | General Summary Statistics | | | % Reach by Carrier | | | | |
|---|---|---|---|---|---|---|---|---|
| Site | Number of Unique Visitors | Total Number of Hits | %Reach | Carrier 1 | Carrier 2 | Carrier 3 | Carrier 4 | Carrier 5 |
| yahoo.com | 709 | 1,575 | 45% | 43% | 48% | 52% | 37% | 46% |
| ebay.com | 118 | 981 | 12% | 13% | 11% | 12% | 14% | 10% |
| msn.com | 35 | 315 | 11% | 11% | 13% | 9% | 10% | 12% |
| amazon.com | 14 | 200 | 7% | 6% | 7% | 7% | 7% | 8% |

*FIG. 10A*

Average User Porfile

| | Total | Carrier 1 | Carrier 2 | Carrier 3 | Carrier 4 | Carrier 5 |
|---|---|---|---|---|---|---|
| Total Number of Data Sessions | 21 | 13 | 27 | 26 | 17 | 21 |
| Total Time of All Sessions, Minutes | 315 | 202 | 410 | 394 | 261 | 312 |
| Average Time per Session, Minutes | 15 | 10 | 20 | 19 | 12 | 15 |
| Total Number of Unique Sites Visited | 84 | 54 | 109 | 105 | 70 | 83 |
| Average Number of Unique Sites Visited per Session | 4 | 3 | 5 | 5 | 3 | 4 |
| Average Time Spent per Site, Minutes | 4 | 2 | 5 | 5 | 3 | 4 |

*FIG. 10B*

SYSTEM AND METHOD FOR MEASURING WIRELESS DEVICE AND NETWORK USAGE AND PERFORMANCE METRICS

CROSS REFERENCE TO RELATED APPLICATION

This application is a continuation-in-part of Ser. No. 09/654,486, filed Sep. 1, 2000.

BACKGROUND OF THE INVENTION

1. Field of the Invention

This invention relates generally to wireless devices and networks, and in particular, to systems and related methods for measuring wireless device and wireless network usage and performance metrics.

2. Description of the Related Art

Traditionally, consumers have used wireless devices for basic telephony with limited use of basic one-way text messaging features and enterprise based data applications. The recent growth in the wireless industry along with the popularity of the internet has led to a natural convergence of the two. This new combined communications application and set of services including applications such as wireless web microbrowsing, web clipping applications, one-way and two-way text messaging, are commonly referred to in the industry as wireless data, wireless internet, or wireless web services. Mobile telephone handsets, pagers, and personal digital assistants (PDAs), for example, all now have wireless data capabilities and are commonly referred to in the industry as wireless devices.

Wireless data is an enhancement to traditional wireless services provided by cellular, PCS, SMR, and paging network operators. The Wireless Application Protocol (WAP) is a key enabler of wireless data—with wireless device users now able to browse internet sites, purchase goods and services, send and receive email, have a broad array of internet content pushed to their wireless devices, and access corporate and personal information using their wireless devices. Today in the United States carriers have rolled these wireless data services out over networks such as circuit-switched and CDPD, but these and other services will soon be provided over faster, more advanced wireless network technologies, for example High Data Rate [HDR], General Packet Radio Service [GPRS], Enhanced Data Rates for GSM Evolution [EDGE], 1XRTT, CDMA2000, and Wideband CDMA [W-CDMA].

Wireless data industry participants such as service providers, advertisers, content providers and electronic and mobile commerce companies have a need for information on consumer activity and usage of wireless data. First, for example, there exists a need to collect information on the activity and usage behavior of wireless data users. Consumer usage, audience, and purchase information statistics are staples in most developed industries. There is a need to rapidly make these information streams available to all participants of this new and not well understood industry in order to expedite the development of more effective service and product offerings—thereby improving the satisfaction level of users, accelerating the overall growth of the industry, and saving industry participants time and money by avoiding uninformed strategies and initiatives. Second, for example, there is a need to make available to the wireless industry a continuous, real-time set of independent and unbiased network and device performance data. Not only is there a need by network operators and device manufacturers to benchmark the performance of their own networks and devices specifically as it relates to wireless data and more traditional wireless voice applications, but also there is a need to provide to sellers, advertisers, and content providers objective data on the level of service customers are receiving from wireless network and device partners. Third, for example, there is a need to integrate these information streams together, thereby providing industry participants an improved understanding of how wireless network service levels and device performance characteristics (and changes in them) impact wireless data user behavior. For instance, there is a need by electronic and mobile commerce companies to quantify "lost revenue" resulting from a failed wireless transaction due to poor network performance.

Usage, Audience, and Purchase Information

While the popularity of wireless telephony and WAP-based data services is surging, there has been no reliable system for measuring wireless data user behavior. Today, competitive marketing information on the wireless data industry is obtained primarily through consumer surveys, the accuracy of which are unreliable and often in question by the industry.

As a result, there is an acute demand for a more accurate service that monitors user activity and usage of wireless data. Wireless network operators, wireless device manufacturers, advertisers, and content providers are all looking for more accurate and detailed information to be able to better understand the behavior, experiences, and needs of wireless data users. Limited data presently exists on even the most basic of questions regarding wireless data users—the numbers and demographics of users; what wireless devices and networks they use; when, how often, for how long, and from what location they access the wireless internet; what sites they visit; what transactions they execute; what advertisements they view/redeem, etc. As the industry advances and matures and users of wireless data become more sophisticated, the ability to track user behavior over time will also become particularly important. Services exist in the wired internet and other industries that provide this type of consumer usage, audience rating, and purchase data.

Creating a system and method to effectively and accurately collect wireless data consumer usage and activity information poses a number of challenges over the wired internet industry. For instance, challenges typically confronted where wireless devices are involved include restricted memory capacity, power limitations, limited processing power, multiple proprietary operating systems with limited interfaces, and the like. Furthermore, there is a need to accommodate activity relating to different wireless network protocols, each designed according to its own specifications. Moreover, there is a need to track activity across a range of data applications and protocols including for example WAP, web clipping applications, HTML, WML, and XML browsers.

As the wireless data industry prepares for the expected flood of new wireless data users, there exists a strong market need for improved wireless data consumer usage and activity information.

Network/Device Performance Information

A strong market need exists for a system to monitor the performance of wireless data networks and wireless devices. At present, there is no industry standard for "Quality of Service" (QOS) data on the performance of wireless data networks. Currently, network operators generally conduct proprietary drive test network benchmarking activities solely for their own internal use. Network operators generally do not make this information available to external parties, such as dotcoms, internet content partners, wireless data application services providers, wireless advertisers, wireless electronic commerce companies, etc. Even if such information were made available to other industry participants outside the network operator's organization, the information would not be sufficient because of the proprietary nature and varying approaches for data collection across network operators, lack of a standard schedule for data collection, and biases resulting from rating the performance of a network provider's own network versus that of its competitors.

Consequently, there is a need for a more robust and real-time method of monitoring the data performance of wireless networks. Network operators are inexperienced in providing data services, and they are keenly interested in information that will help them understand how their networks stack up in supplying wireless data services and where, when, and how to optimize their networks. Carrier interest in objective QOS data has been further heightened by recent federal mandates for E911 service capabilities—carriers can no longer tolerate coverage gaps and prolonged problems in their service areas. Objective information on the performance of network operators is also of great interest to other wireless industry participants who are looking to focus their sales, marketing, and product development efforts on those network operators and geographies providing satisfactory levels of service to wireless data users. In the wired internet industry, existing information service companies provide non-user based, automated, real-time QOS tracking of web hosting servers and backbone networks. There now exists a need to capture performance measurements which include wireless data in addition to the traditional back-end wireline performance metrics. This type of end-to-end measurement, which includes wireless data, is a more complex process compared with the back-end measurement typified by the wired internet industry as it must include the radio link. Continuously tracking statistics concerning RSSI, channel assignments, bit error rates, transmit power, call result, etc. can benefit the wireless data industry participants and users.

Similarly, there is a need for improvement in the real-time collection of wireless device statistics. Presently, manufacturers conduct only pre-shipping device performance tests. Once in the hands of consumers, the burden ordinarily is placed solely on wireless data users to determine whether a device is not functioning correctly. This is fairly easy if the device does not turn on or is visibly broken, but more difficult when other more subtle failures or performance degradations occur. For instance, there exists a need for wireless device parametric information based on real-time user activity (which can be tracked over a period of time) on metrics such as DSP, battery life, power consumption, finger assignments, etc. Device manufacturers and network operators, for example, could use this information to identify and replace "out of spec" or malfunctioning devices, thus reducing the number of wireless data users experiencing wireless device related performance problems. Other information such as available memory, control settings, and Personal Information Management (PIM) feature utilization could also assist device manufacturers in planning future wireless device features. Overall, such a capability could lead to greater wireless data user satisfaction with network operators, wireless device manufacturers, applications companies, as well as help those parties more quickly understand device performance characteristics and address device design and manufacturing issues, in order to bring improved products and services to consumers.

Integrated Information

The breadth of information services encompassed within the invention as well as the ability to capture real-time, comprehensive marketing and performance information is distinguished from any conventional market research methods that currently exist. The unique ability to integrate these data streams adds further value to the wireless data community. For example, there has been a need to simultaneously collect information about user activity and network performance. By analyzing these two data streams, service providers will be able to draw meaningful insights into the effects that network performance has on the usage patterns of their customers.

There also exists an increasing need to make available to location-based advertisers information on latency and delivery failure rates of "push" notification services over competing wireless networks at specific times and in specific geographies (e.g., during a baseball game at the local ball park). Moreover, a need has developed for access to GPS location data or delivery statistics in conjunction with other metrics (e.g., consumer usage behavior, network and device performance) to make real time assessments of network operator service capabilities at specific times and locations. As current constraints on wireless device performance are overcome, constraints such as bandwidth, speed, memory, screen size, etc., there will be an increasing need for information concerning user activity and usage, wireless network performance, and wireless device performance.

SUMMARY OF THE INVENTION

The present invention encompasses systems and related methods for providing wireless device and wireless network usage and performance metrics.

A system for measuring wireless device and wireless network usage and performance metrics is set forth. The system includes a wireless device with a processor and memory, data gathering software installed on the wireless device for collecting device parametric data, network parametric data, and event data. The data gathering software may also collect location data and time stamp data. A plurality of wireless devices may be distributed to a panel of selected users.

In one aspect of the invention, data gathering software may be composed of various modules for collecting device parametric data, network parametric data, and event data, and transmitting collected data via a wireless communication network to a control center for processing.

Another aspect of the invention sets forth a method for measuring wireless device and wireless network usage and performance metrics. The method includes collecting device parametric data, network parametric data, and event data, for example, and transmitting the collected data via a wireless communication network to one or more control centers for processing. In one embodiment of the invention, processing at a control center produces products relating to usage and activity, network performance and device performance, which may be integrated with location and time stamp data.

Another aspect of the invention provides a mobile wireless device comprising an electronic memory encoded with data gathering software and data transfer software. The data gathering software gathers information pertaining to device usage. The gathered information includes event data in association with respective location information indicative of device location during the occurrences of such events. The data transfer software provides the gathered information for transmission.

Yet another aspect of the invention comprises a method of gathering information concerning wireless mobile device usage. The method involves prescribing a panel of respective users of respective mobile wireless devices in which each respective mobile device includes electronic memory encoded with data gathering software and data transfer software. The data gathering software gathers information pertaining to device usage. The gathered information includes event data in association with respective location information indicative of device location during the occurrences of such events. The data transfer software provides the gathered information for transmission. The method also includes collecting the gathered information provided by respective mobile devices of said panel of users.

A further aspect of the invention involves a system for collecting information by at least one control center concerning wireless mobile device usage. The system includes respective electronic memories of respective mobile devices of panelists of a panel comprised of respective mobile device users. The respective electronic memories are encoded with computer software for gathering data and for transferring the gathered data. The data gathering software gathers information pertaining to device usage. The gathered information includes event data in association with respective location information indicative of device location during the occurrences of such events. The data transfer software provides the gathered information for transmission. The system also includes electronic storage media encoded with computer software to control collection by the at least one control center of respective gathered information respectively provided by respective mobile devices of said panel of users.

These and other features and advantages of the invention will be better understood from the following detailed description of a presently preferred embodiment of the invention in conjunction with the appended drawings.

BRIEF DESCRIPTION OF THE DRAWINGS

FIG. 3 sets forth sample access, paging, forward, and reverse channel messages that can be collected by the embodiment of FIG. 1.

FIG. 4 sets forth sample messages collected by a device parametric data module of the embodiment of FIG. 1.

FIGS. 5a, 5b, and 5c, and 5d set forth a sample of event type data gathered by the data gathering software of the embodiment and locations from which various metrics corresponding to event types are gathered.

FIG. 7 shows sample messaging, from a CDMA Processor of the wireless device of FIG. 6, providing a Metric of whether a call is a data call or a voice call.

FIGS. 10a and 10b show sample reports generated from data collected using the system of FIG. 1.

DETAILED DESCRIPTION OF THE PREFERRED EMBODIMENT

The present invention encompasses methods and related systems for measuring wireless device and wireless network usage and performance metrics. The following description is presented to enable any person skilled in the art to make and use the invention, and is provided in the context of a particular application and its requirements. Various modifications to the preferred embodiment will be readily apparent to those skilled in the art, and the generic principles defined herein may be applied to other embodiments and applications without departing from the spirit and scope of the invention. Thus, the present invention is not intended to be limited to the embodiment shown, but is to be accorded the widest scope consistent with the principles and features disclosed herein.

The present invention also provides a novel approach to the gathering of information about the habits and behavior of users of mobile devices. For instance, the convergence of wireless communications and the internet creates new incentives for persons to use wireless devices as they move from location to location throughout the day. Information concerning usage of mobile devices is valuable, for example, to purveyors of internet services and to purveyors of wireless services. A better understanding of user patterns of behaviors in the use of mobile devices can permit the providers of goods and services to mobile device users to better target their efforts. Thus, in another aspect of the present invention, each member of a panel of mobile device users is provided with mobile devices equipped with data gathering software.

The data gathering software reports back, not only on what applications and communications and device features are employed, but also on the location at which such events occur. Moreover, by knowing the location at which such events occur, it is possible to more readily determine the real time of day at which such events take place. By monitoring the mobile device usage by a large enough panel of users as the individual panel members move from place to place, it is possible to garner information that can be analyzed to assess the best way to deliver desired products and services to mobile users in general.

A panel of users may be selected based upon any criteria. The criteria for a mobile device user's being included within a panel may be as broad as possessing a mobile wireless device and a willingness to participate as a panel member. Alternatively, panelists may be selected based on mathematical criteria aimed at eliciting statistically meaningful information about the behavior of some group of persons. Panel membership may be restricted to a group of users sharing some common attribute such as membership in an organization, interest in particular subject matter (e.g., history, music, videos) participation in a particular activity (e.g., politics, skiing, photography) or ownership of a type of car, boat, airplane or pet.

Figure 1:
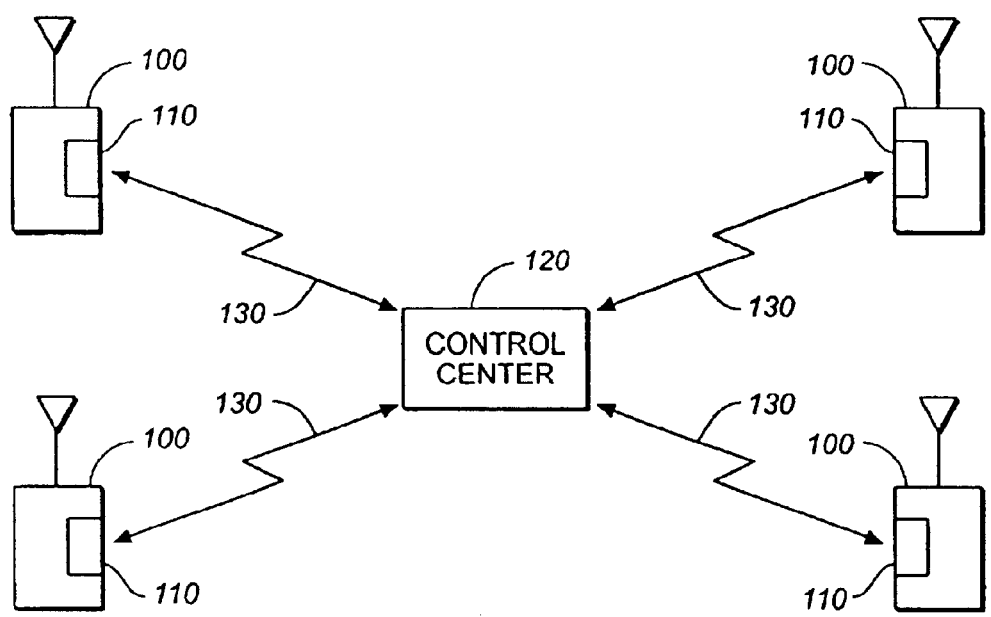
FIG. 1 shows an architecture of a presently preferred embodiment of the invention which includes a system for measuring wireless device and wireless network usage and performance metrics.

Referring to FIG. 1, there is shown an illustrative drawing of an architecture of a presently preferred embodiment of the invention. The embodiment includes a system for measuring wireless device and wireless network usage and performance metrics. A plurality of wireless devices 100 are shown with data gathering software 110 installed on each wireless device 100. Data gathered by the data gathering software 110 is transmitted via a wireless link 130 to a control center 120.

The system illustrated in FIG. 1 measures the usage and performance of a variety of wireless networks and devices by a variety of users. Wireless devices 100 include, but are not limited to, mobile telephone handsets, pagers, and personal digital assistants (PDAs). Wireless networks on which wireless devices 100 operate and from which data is gathered according to the preferred embodiment consist of, for example, circuit switched, paging, and packet data networks and include but are not limited to AMPS, CDMA, TDMA, GSM, iDEN, GPRS, 1XRTT, 3XRTT, W-CDMA, CDMA 2000, ReFLEX, ARDIS, and MOBITEX. The presently preferred embodiment will be described in reference to a wireless handset device 100 using a WAP microbrowser operating over a circuit-switched CDMA network. Modifications to the data gathering software 110 to gather data from other wireless networks and devices will be apparent to those of ordinary skill in the art. It will be appreciated, however, that the principles of the invention described herein may be applied to other wireless devices as well.

The data gathering software 110 tracks the usage and performance of individual user activity of wireless voice and wireless data services. In the one embodiment data gathering software 110 resides on the mobile station modem (MSM) or equivalent device modem of wireless device 100. In alternative embodiments, the data gathering software 110 may reside, for example, embedded in microbrowser applications or on the operating system of the wireless device 100. Information collected by the data gathering software 110 may be stored on the MSM or equivalent device modem or when applicable, the SIM card or the device's volatile and/or non-volatile memory. In another embodiment, the data gathering software 110 may collect and transmit data real-time. In the preferred embodiment automatic data delivery may be triggered on a periodic basis, or alternatively data delivery may be launched via user or control center driven activity. For example, in the case of control center driven activity, commands may be sent to the data gathering software 110 via a server, or like mechanism, to collect certain data after which collected data may be routed through an intermediate server that then feeds data to the control center.

Data gathering software 110 may be equipped with standard features such as an installation application, a system configuration and application scanner, automatic software update feature, data compression algorithm and data encryption system. These standard features are well known to those of ordinary skill in the art. The installation application may prompt the user for household/user profile information and request confirmation of user consent to the data gathering process before the data gathering software is launched. After the initial installation process, the data gathering software 110 is transparent to the user during operation of the wireless device 100. The system configuration and application scanner records detail relating to the configuration features and specifications of the wireless device 100 and any applications loaded onto it. Data collected by the data gathering software 110 may undergo a filtering process to remove extraneous data and may also be compressed using standard data compression techniques to conserve memory resources on the wireless device 100 as well as to enable more efficient transfer of data to the control center 120. Data gathered may also be encrypted using standard encryption techniques to provide security for the data collected from the user's wireless data activities and to provide privacy to protect the user's identity.

In the one embodiment, the data gathering software 110 residing on the wireless device MSM is written in C++, while in alternative embodiments it may be written in other coding languages such as Java or the like. The data gathering software 110 operates in the background of the wireless device's 100 operating system and standard applications. The design of the data gathering software 110 adheres to and incorporates wireless protocols and standards for voice and data communication services on CDMA networks and devices. These documents include (1) TIA/EIA-95-B (Mobile Station-Base Station Compatibility for Wideband Spread Spectrum Cellular Systems), (2) ANSI J-STD-008 (Personal Station-Base Station Compatibility Requirements for 1.8 to 2.0 GHz Code Division Multiple Access Personal Communication Systems), (3) ANSI J-STD 018 (Minimum Performance Requirements for 1.8 to 2.0 GHz Code Division Multiple Access Personal Stations), (4) TIA/EIA/IS-99 (Data Services Option Standard for Wideband Spread Spectrum Digital Cellular Systems), (5) TIA/EIA-637-A (Short Message Service for Spread Spectrum Systems), (6) TIA/EIA-683-A (Over-the-Air Provisioning of Mobile Stations in Spread Spectrum Systems), and (7) various WAP documents (Wireless Application Protocol Architecture Specification, Wireless Application Environment Specification, Wireless Telephony Application Specification, Wireless Transaction Protocol Specification, Wireless Datagram Protocol Specification).

Features of the data gathering software 110 include the ability to collect disparate data streams; data filtering mechanisms; default data collection protocols; real-time event, user and control center driven data collection routines; a storage system; and a file transfer system. The data gathering software 110 is also designed with interoperability in mind without interference with subscriber software installed on the wireless device.

The data gathering software 110 is loaded onto the wireless device 100 through an external download process.

In the preferred embodiment, this is done through a "flash" load process. In the flash load process, the wireless device 100 is taken off line and connected through the serial port connector to a PC via the specified cable interface for the device. A script command is entered into the PC and initiates the application of a series of electrical currents to specific pins of the wireless device 100 that are reserved exclusively for software loading. Through this connection the data gathering software 110 is transferred to the MSM of the wireless device 100. At the end of the flash load process the wireless device 100 is restarted, with the data gathering software 110 now functioning. In alternative embodiments, the external download could be done, for example, through a wired or wireless synchronization process or through an Over-the-Air [OTA] process. The data gathering software may be loaded, alternatively, at the time of manufacture of the wireless device. For example, the data gathering software may be loaded as part of a browser application installed by the manufacturer of the wireless device.

Figure 2:
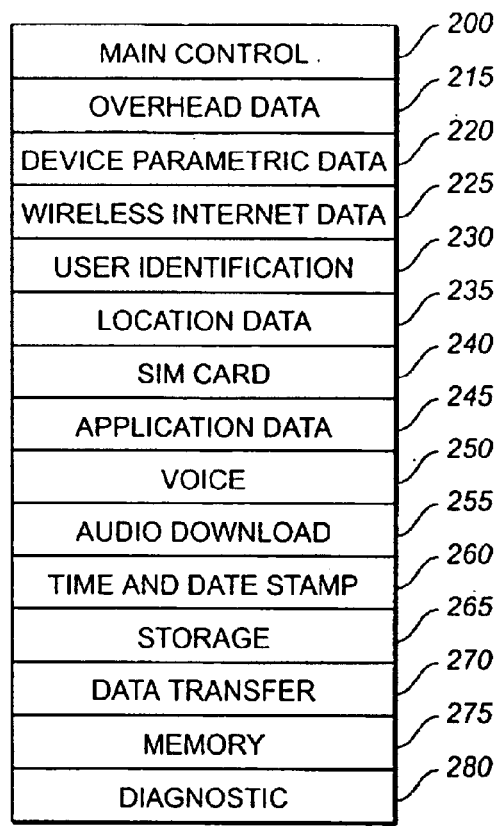
FIG. 2 sets forth the component modules of data gathering software of the embodiment of FIG. 1.

Referring to the illustrative drawings of FIG. 2, the component modules of an embodiment of the data gathering software 110 are shown. The data gathering software 110 is based on a common Application Development Interface. The data gathering software 110 includes of a Main Control Module (MCM) 200 along with additional modules that plug in and perform specific tasks seamlessly with the underlying subscriber software. In one embodiment, these component modules include an Overhead Data Module 215, a Device Parametric Module 220, a Wireless Internet Data Module 225, User Identification Module 230, Location Data Module 235, SIM Card Data module 240, Application Data Module 245, Voice Module 250, Audio Download Module 255, Time and Date Stamp Module 260, Storage Module 265, Data Transfer Module 270, Memory Module 275, and Diagnostic Module 280. Each module performs tasks in all active wireless device modes (e.g., idle, voice conversation and data), but some module data sets may differ from mode to mode. It should also be noted that data modules may be run in parallel.

Figure 2A:
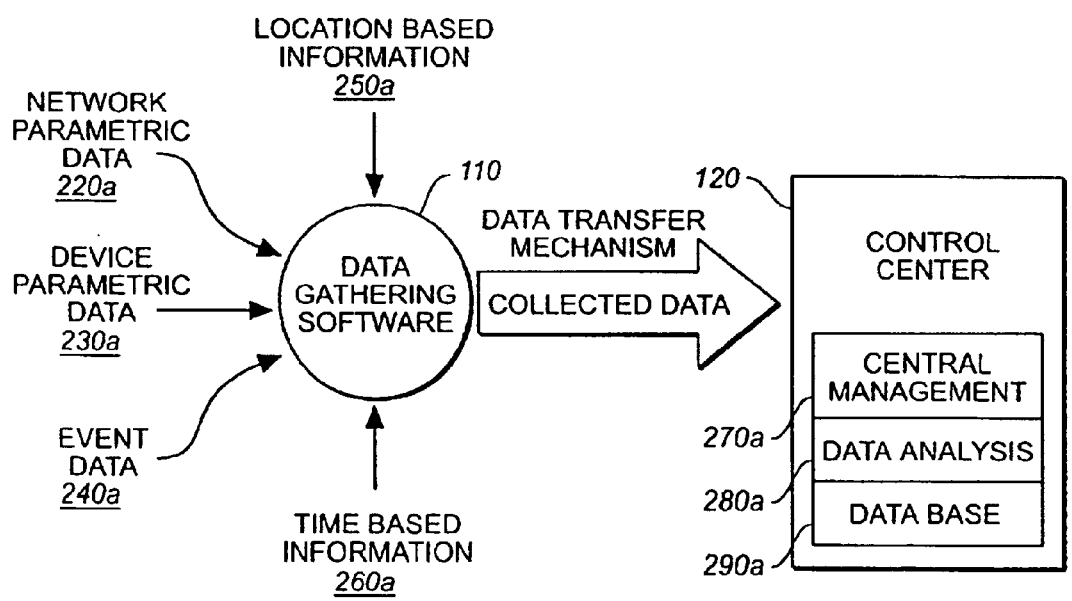
FIG. 2a sets forth an illustration of the operation of the architecture shown in FIGS. 1 and 2.

Referring to the illustrative drawings of FIG. 2a, a simplified illustration of the operation of an embodiment of the invention is shown. At the center of the system is the data gathering software 110. Data gathering software 110 monitors and collects several types of information from different sources including event data 240a, device parametric data 230a, network parametric data 220a, location information 250a, and time information 260a. Data gathering software 110 may be activated by user event driven activity, or alternatively, control center driven activity such as in cases in which commands are sent to the data gathering software 110 via server, or like mechanism, to collect certain data after which collected data is routed to an intermediate server, or like mechanism, that then feeds data to the control center. The collected data is sent to the control center 120 where it is managed via a central management system 270a and undergoes data analysis 280a. The collected data and analysis results are stored in a database 290a.

An "event" as used herein is user activity on a mobile wireless device. An event may encompass any user activity for which data can be gathered. Although data is not necessarily gathered for all events. Rather, it is gathered only for those events prescribed to be data gathering events. A new event occurs whenever a user initiates a new device activity. The following are a few illustrative examples of events. The launching of an application is an event. The downloading of a web page is an event. Communication over a wireless voice or data channel is an event. Even pressing a single key on a wireless device keyboard is an event.

Event data 240a includes any data associated with activity on the device by a user. It may include identification of applications that have been launched such as a word processing application, a scheduling application or a browser. It may also include information retrieved or used in connection with any of these applications such as a URL used to download a webpage. Event data may include statistics concerning events. Event data may be associated with temporal information such as the date and time of occurrence of an event as well as the geographic information such as the geographic or physical location of a mobile device in the course of the event. Such associated geographic information may comprise data such as GPS data which may be transmitted to a server and from which the physical location of the device can be derived by the server, for example. It will be appreciated that the location may be ascertained at any point in a time interval spanning the start of the event, the occurrence of the event and the conclusion of the event. Data applications include, for example, microbrowser or equivalent internet browsing activity, web clipping applications, mobile commerce transactions, mobile advertising activity, e-mail activity, and Bluetooth application usage. Device applications include, for example, games, address books, personal information management software, and media players used for streaming audio and video. Event statistics include, for example, voice and data call activity and SMS or similar text messaging activity. Network parametric data 220a includes for example, in the case of CDMA, overhead messaging data such as systems parameters messages, authentication challenge messages, and service redirection messages. Device parametric data 230a includes, for example, battery statistics (such as charging state, voltage, last charge and temperature), energy/interference parametrics, receive/transmit power, frame error rate, call set-up statistics (such as access time, call origination, and call termination). Sources from which data is collected may include various components of the wireless device, such as processors (including the mobile station modem or equivalent, global positioning system processor or equivalent, and other central processing units on wireless devices), volatile and non-volatile memory locations, and embedded applications such as a microbrowser, game, or audio file player.

Referring to the illustrative drawings of FIG. 2, a description of each module follows:

1. Main Control Module (MCM)

The MCM 200 is responsible for the management and control of the data gathering software activities. The MCM 200 sends requests and instructions and receives messages from other modules. For example, the MCM 200 performs functions such as tasking, command and control, configuration, and upgrades to the data gathering software 110 itself.

2. Overhead Data Module (ODM)

The ODM 215 collects information by monitoring the overhead message stream. While the wireless device 100 is powered on, information is collected while the device 100 is in any state such as idle, conversation, and data mode. A list of sample overhead messages monitored by the data gathering software 110 is illustrated in FIG. 3. Information collected by the ODM 215 includes, for example, network information such as call performance, coverage, configuration settings, and management; event information such as voice call, data call, and Short Message Services (SMS) activity; location information such as longitude, latitude, and GPS data; and time and date information.

3. Device Parametric Data Module (DPDM)

The DPDM 220 monitors and collects information from the network and device. A list of the sample data monitored and collected by the DPDM 220 is in FIG. 4. Information collected by the DPDM 220 includes for example, receive power, transmit power, frame error rate [FER], signal strength [RSSI], access time [call setup], time stamp, date stamp, location data, and airtime usage. The information collected can be used to gain insights into the performance of networks and devices in the environment.

4. Wireless Internet Data Module (WIDM)

The WIDM 225 monitors and collects information from internet-based applications such as a microbrowser or web query application. When launched, the internet-based application enters a session through the wireless network with different types of network servers such as proxy, gateway, content and application servers. Today, multiple types of protocols and mark-up languages exist and are designed to make various types of content, applications, and services accessible to wireless devices. Examples of such protocols and mark-up languages include the Wireless Application Protocol [WAP], Palm Query Applications [PQAs], iMODE, HDML, WML, XML, and HTML. Once a wireless connection to the internet and/or the network provider's data network (or equivalent) has been established, accessing WML content from a wireless phone through the WAP protocol is very different from accessing HTML content via traditional personal computer applications like Microsoft Explorer or Netscape Navigator. For example, WML introduces the concept of decks and cards, a concept that does not exist in HTML. Cards specify one or more units of user interaction. A deck represents the unit of content transmission that is sent over the wireless network to the device. Therefore, a deck can contain one or more cards. A user can navigate through multiple cards before sending a request over the network to retrieve an additional deck.

5. User Identification Module (UIM)

The UIM 230 is responsible for collecting data from the user of the wireless device 100 through invoking a questionnaire in certain circumstances and prompting the wireless user to input desired information. Examples of information collected by the UIM 230 include User name, Date of birth, Sex, Race, Income, Address, Marital status, Education, Occupation, and User authentication or password.

6. Location Data Module (LDM)

The LDM 235 is responsible for collecting all data relating to location such as longitude, latitude, GPS data, time stamp, and date stamp. The collected data can be referenced back to wireless device 100 events and statistics. The LDM 235 may also collect additional information so that the location information can be used to determine the user's direction of travel, speed, and time in order to correlate the information to specific events.

7. SIM [Subscriber Identity Module] Card Data Module (SCDM)

The SCDM 240 interfaces the wireless device's SIM card and is responsible for collecting data stored on the wireless device's 100 SIM card.

8. Application Data Module (ADM)

The ADM 245 is responsible for monitoring the activity of all applications resident on the wireless device 100. The ADM 245 collects data about all resident applications such as the application name, usage statistics, application file size, and configuration information. The ADM 245 collects information at multiple instances such as when applications are loaded, removed, launched, restored, switched, and terminated.

9. Voice Module (VM)

The VM 250 is responsible for collecting information relating to voice commands, applications, and activity. In addition to the conventional keypad or stylus based functions users may also have the ability to perform various activities using voice commands and responses. Such voice commands and responses may include voice-to-text and text-to-voice conversions, voice activated dialing, voice activated microbrowsing, and voice controlled applications. The VM 250 monitors activity in voice recognition engines and processors and collects information related to any such user activity conducted via voice.

10. Audio Download Module (ADM)

The ADM 255 is responsible for collecting audio-based user activity. Users may receive/download audio from their wireless devices in the form of advertisements, music, and the like. The ADM 255 will capture data relating to such activity.

11. Time and Date Stamp Module (TDSM)

The TDSM 260 monitors and collects information from the network and device parameters. Examples of information collected by the TDSM 260 include the time, which can be represented in hours, minutes, and seconds, and the date, which can be represented in month, day, year. The information collected by the TDSM 260 can be integrated with information collected from other data modules so that time and date information can be associated with event data.

12. Storage Module (SM)

The SM 265 is responsible for collecting information from each data module and encrypting, compressing, and storing the data in log file format in the non-volatile memory locations of the wireless device. In one embodiment of the invention, the storage module 265 comprises non-volatile memory locations where the Data Gathering Software 110 temporarily stores data before being handled by the Data Transfer Module. This may occur when there is no network connection available to transmit, if the Data Gathering Software 110 determines that immediate transfer of data would result in a poor user experience, or the data collected is required to be transferred immediately to the control center such as information collected by the User Interface Module 230.

13. Data Transfer Module (DTM)

The DTM 270 prepares prescribed gathered data for transmission to the control center 120. In a present embodiment, the DTM 270 also is involved in transmission of information collected by the data gathering software 110 to the control center 120. The DTM 270 can operate in multiple modes including automatic, pull, and push. In automatic mode, the DTM 270 sends data to the control center 120 based on a predetermined set of factors. In pull mode, the DTM 270 sends data based on commands received from the control center 120. This may include, for example, activity in which commands are sent to the data gathering software 110 via server, or like mechanism, to collect certain data after which collected data is routed to an intermediate server, or like mechanism that then feeds data to the control center. In push mode, the DTM 270 sends data based on commands from the user. The DTM 270 also prepares the data for transfer by performing functions such as packetizing the collected data, attaching identifying information to the packets of data, and initiating, executing, and managing the data transmission process. The transmission process could include for example, sending the collected data to the control center 120 through a mobile originated Short Message Service [SMS] message, sending the collected data during a microbrowser session, or sending the collected data through a synchronization application. In another embodiments of the invention, the DTM 270 may prepare the gathered data for transfer via email. In yet another embodiment of the invention, the DTM 270 may prepare the gathered data for transfer via an HTTP post command to a designated URL. In still another embodiment of the invention, the DTM 270 may be used to transfer gathered data during a "hotsyc" session.

14. Memory Module (MM)

The MM 275 is responsible for clearing the memory location once the DTM 270 has successfully transmitted the collected data to the control center 120. The MM 275 receives commands from the DTM 270 in conducting this operation. In alternate embodiments, the MM 275 can be a built-in part of the operating system of the device.

15. Diagnostic Module (DM)

The DM 280 is responsible for running diagnostic tasks on the MCM 200 and other modules of the data gathering software 110. For instance, the DM 280 can be periodically activated automatically by the device 100 to check whether the data gathering software 110 in fact is gathering what it is supposed to be gathering. Also, the DM 280 is responsible for self-updating any data gathering software 110 module to add features or correct any bugs and for resetting and rebooting the wireless device if it detects a problem with data gathering software 110 activity.

Figure 6:
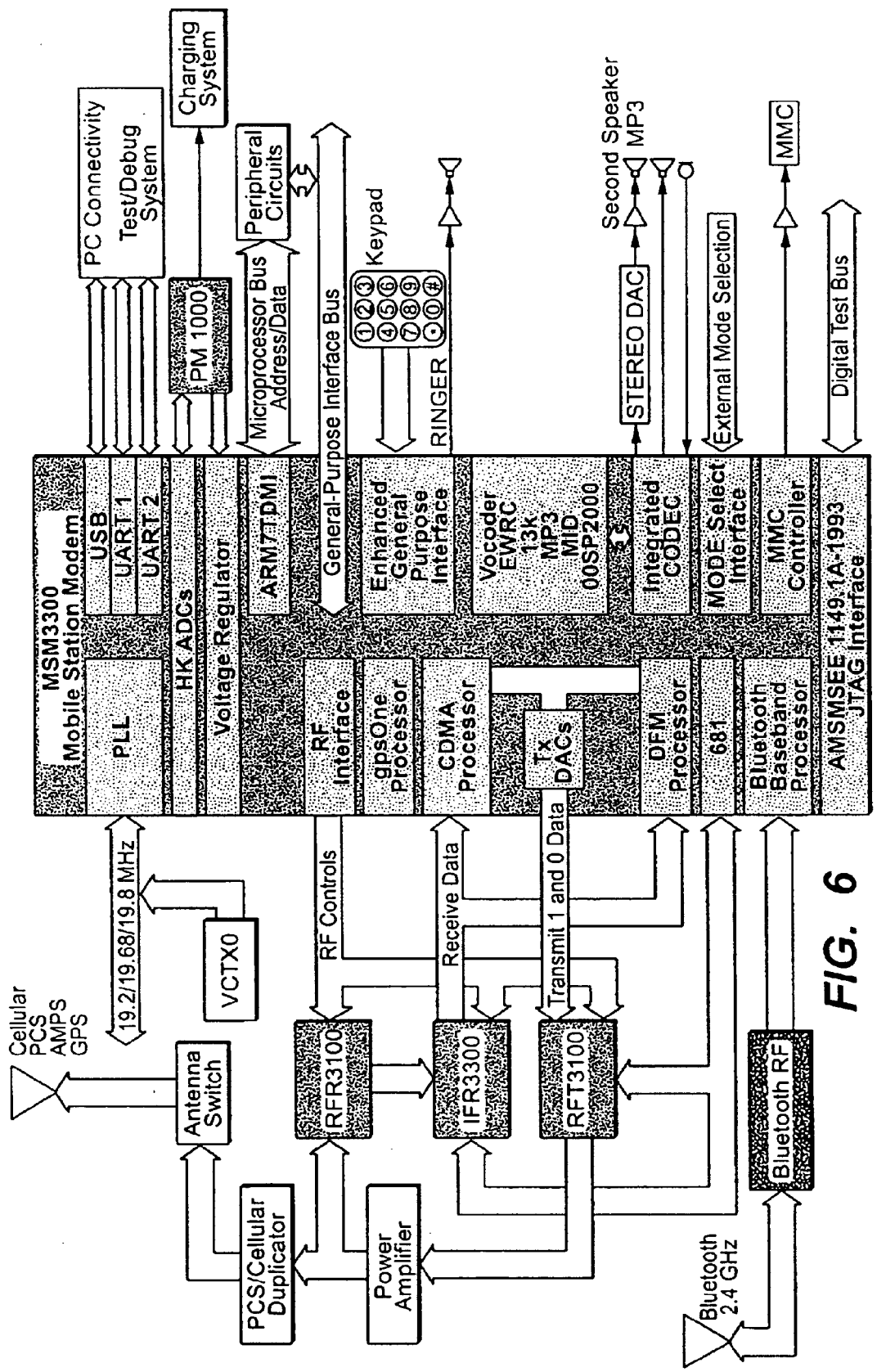
FIG. 6 sets forth a sample mobile station modem (MSM) wireless device function block of the embodiment of FIG. 1.

FIGS. 5*a*, 5*b*, and 5*c*, and 5*d* set forth an illustrative log 500 of sample event type data gathered by the various component modules of the data gathering software 110 and the MSM location from which various metrics corresponding to event types are gathered. FIGS. 5*a*, 5*b*, 5*c*, and 5*d* are for illustrative purposes, and do not set forth a complete list of types of event type data gathered. Referring to FIG. 6, an illustrative sample wireless device 100 functional block diagram for an MSM is set forth. The sample wireless device 100 functional block diagram is only one potential embodiment of a wireless device 100 modem from which metrics can be gathered. For illustrative purposes, event types in the log are divided into the categories of basic phone functions, voice call events, browser call events, M-Commerce, M-Advertising, and SMS messaging. These categories are for illustrative purposes only of the types of event data that are gathered by various component modules of the data gathering software 110 and are neither exhaustive nor complete. Referring to FIG. 5*a*, for each event type 510, there are corresponding metrics 520 which are collected by various component modules of the data gathering software 110. The MSM Location 530 of the MSM shown in FIG. 6 from which the Metrics 520 are gathered is also set forth. For example, for the Event Type "Mobile Voice Call Connect" 540 shown in FIG. 5*b*, the Metrics 520 gathered are TD-LL information (Time, Date, Long-Lat), Vocoder, Transmit Power, Receive Power, and Frame Erasure Rate. These Metrics 520 are gathered from the CDMA Processor and GPS Processor at the MSM Location 550 by the Overhead Data Module 215. Similarly, other Voice Call Event Types such as Land-Side Voice Call and Mobile Voice Call End shown in FIG. 5*b* are collected by the Overhead Data Module. Event types such as External Power Applied and Power Up shown in FIG. 5*a* are collected by the Device Parametric Module 220. Event Types such as Mobile Browser Launch and Deck (URL) Request are gathered by the Wireless Internet Data Module 225.

Figure 11:
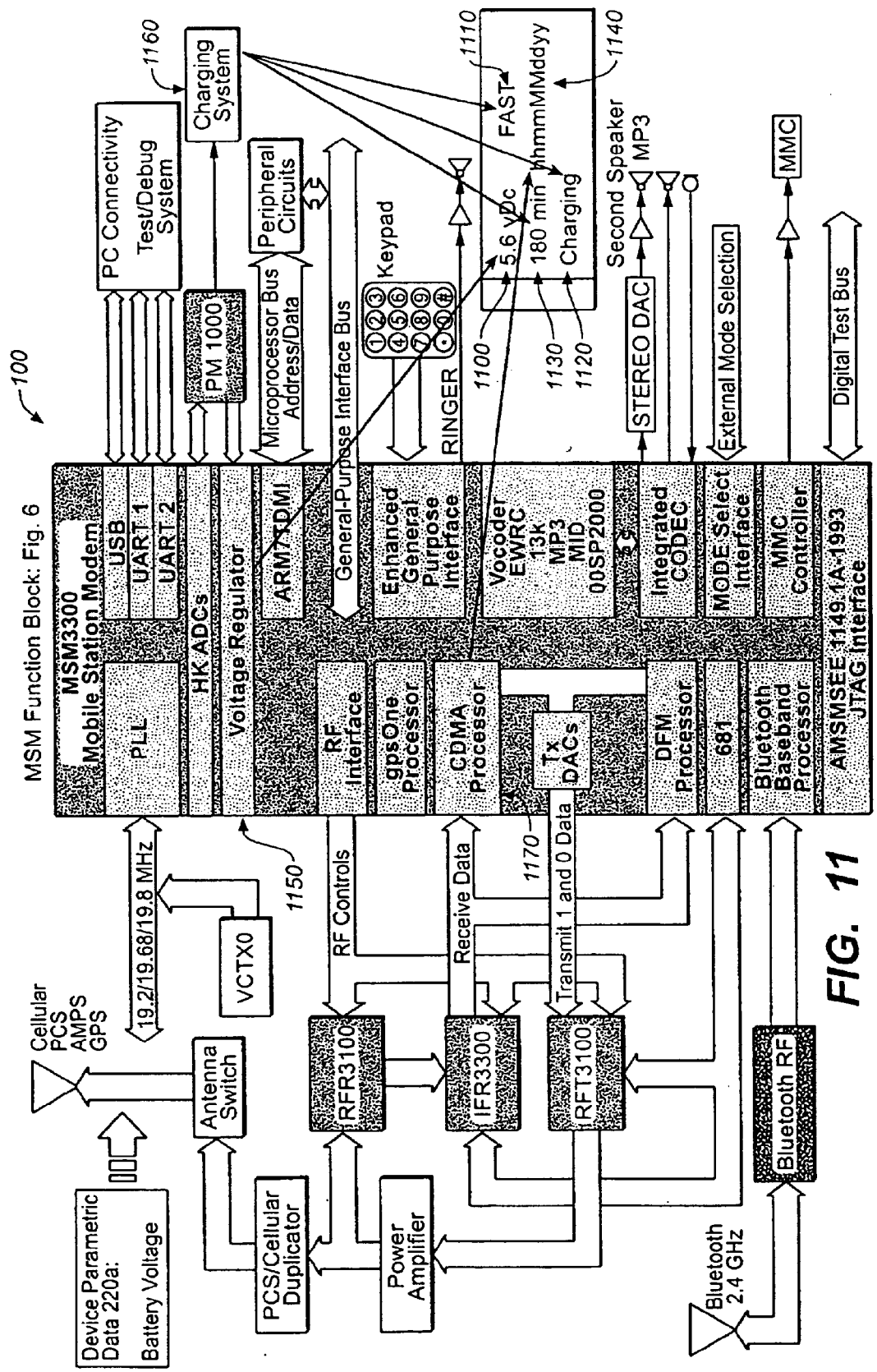
FIG. 11 shows an illustration of the MSM locations where device parametric data is collected.

Referring to FIG. 11, there is shown an illustration of the MSM component locations where device parametric data pertaining to various aspects of battery status can be acquired. The current battery voltage 1100 is obtained from the voltage regulator 1150. Charge rate 1110, charging state 1120, and charge time 1130 are obtained from the charging system 1160. Time stamp information 1140 is obtained from the CDMA processor 1170. In this example, the data gathering software elicits this various information from these various components of device 100 in order to provide device parametric data on battery power. It will be appreciated that the data gathering software may elicit information from these and other components to provide parametric data concerning other device characteristics.

Referring to FIG. 5, Metrics 520 are gathered from messaging information at the various MSM Locations 530. FIG. 7 shows illustrative sample messaging from the CDMA Processor of an MSM used to identify the Metric of whether a call is a data call or a voice call. Two potential origination messages under the CDMA messaging standard TIA-95-B are shown, origination message 710 and origination message 720. For example, the value of the special service code 730 or similar identifier, such as a service option code, may identify whether a call is a data call or a voice call. In this example, a special service code 730 value equal to zero indicates a data call whereas a value equal to one indicates a voice call. Thus, in this example, the data gathering software 110 can determine whether a call is a voice call or a data call by parsing the origination message collected from the CDMA processor. In the examples shown in FIG. 7, origination message 710 corresponds to a data call whereas origination message 720 corresponds to a voice call.

Figure 8:
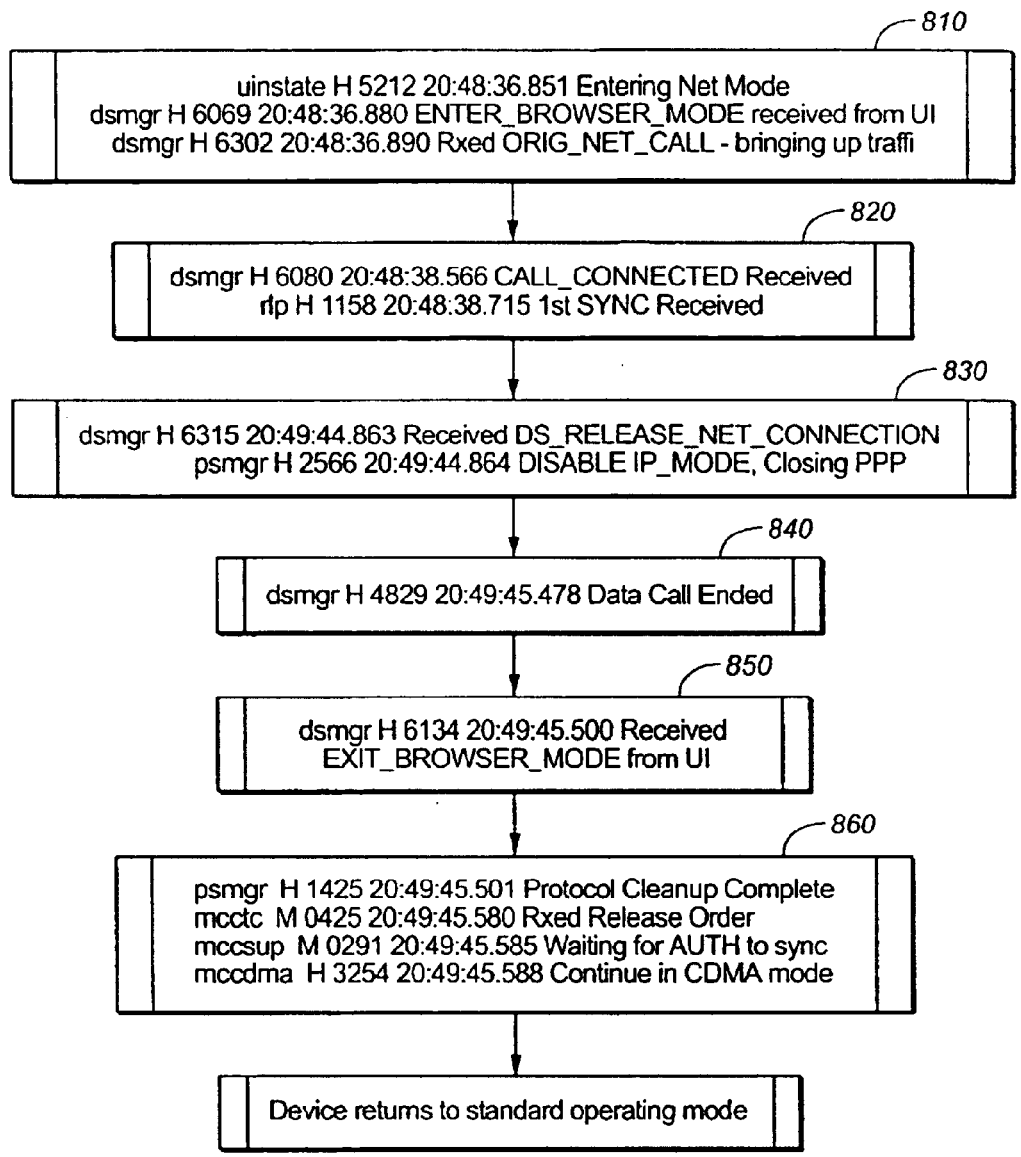
FIG. 8 sets forth a flow chart for messaging at the wireless device of FIG. 6 relating to the launch, use, and termination of use of a wireless microbrowser.

Referring to the illustrative drawings of FIG. 8, messaging at the CDMA processor of the MSM relating to metrics for the launching, use, and termination of use of a wireless microbrowser is set forth. At block 810, messaging corresponding to the entering of the microbrowser mode are set forth. At step 820, messaging relating to the connection of the call for microbrowsing is set forth along with messaging indicating the radio link protocol (rlp) for synchronization of the call with the network. Step 830 shows messaging for releasing the network connection indicating the ending of use of the browser. Step 840 shows messaging for the ending of the microbrowser call, and Step 850 shows messaging for exit from the user interface of the browser mode. Step 860 shows messaging relating to the resetting of various parameters to return the device to standard operating mode.

Figure 9:
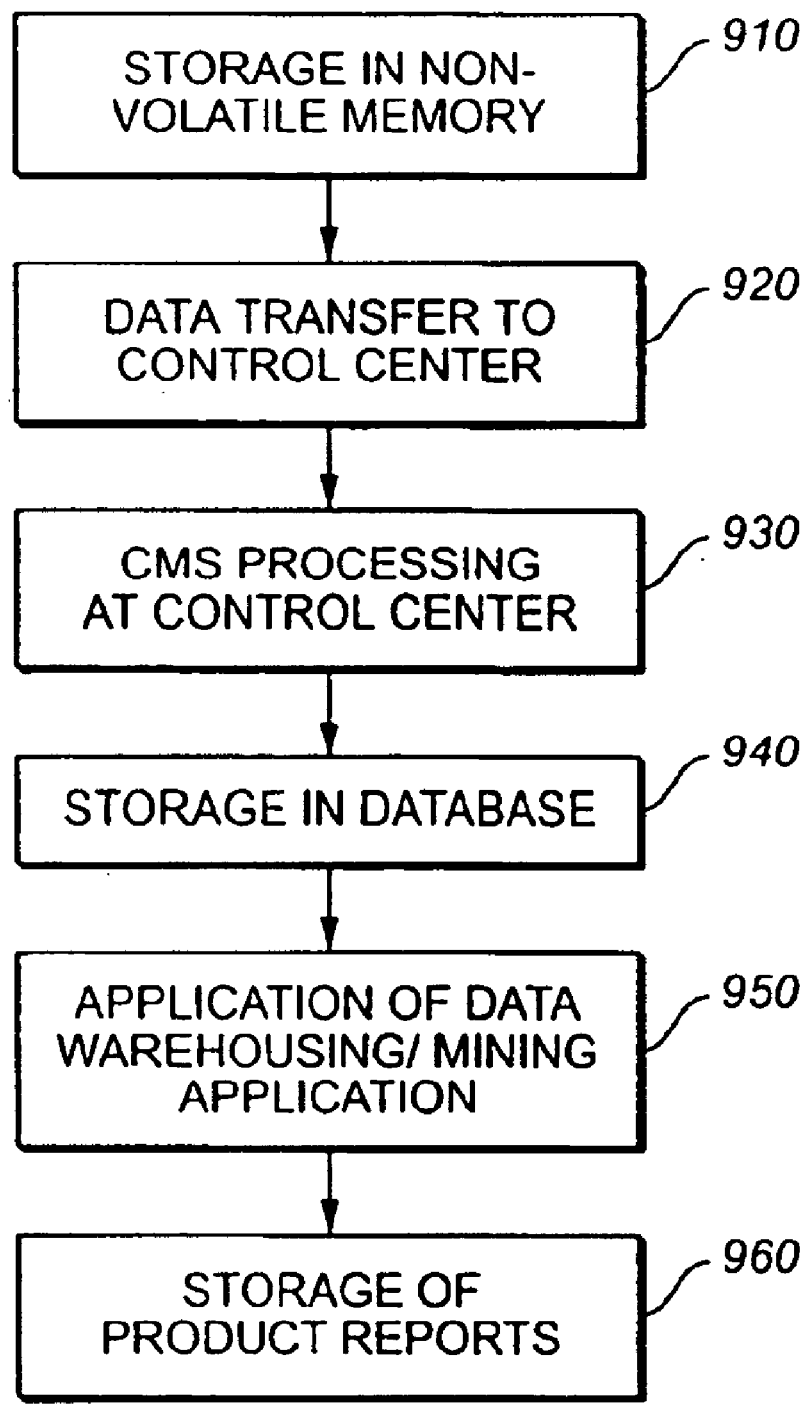
FIG. 9 sets forth a flow chart of the path of data collected by data gathering software of the embodiment of FIG. 1.

Referring to the illustrative drawings of FIG. 9, a diagram showing the flow of data collected by the data gathering software 110 in one embodiment of the invention is presented. At 910, the collected data is stored at each wireless device 100 in the non-volatile memory (or equivalent) of the wireless device 100. At 920, the collected data is sent over a wireless link 130 to a control center 120 that manages the collection and quality control processes of the data from each wireless device 100 in the field as well as the overall administration of the network. At the control center 120, management of data collection and quality control processes is handled by a Central Management System (CMS) 230*a*. A graphic user interface (GUI) client allows the CMS administrator at the control center to communicate and run checks during the data management process. At 930, the CMS 260*a* prepares the data received for database processing. This preparation includes decompressing files, cataloging and archiving the files and staging files for database entry. To perform its activities, the CMS may include an administration server, web server, contacting server, name server, FTP server, VPN server, data collection manager server, alarm manager server, event manager server, and configuration manager server.

At 940, the prepared data is then loaded and stored in a database. The database uses device identification number, device type, user ID, event type, network identification, market identification, and longitude/latitude coordinates in tables to cross-reference values in a user information table for each event (i.e., message).

At 950, a data warehouse/mining application processes the collected data stored in the database to generate information including usage, service functionality, network and device performance metrics. This process may include: sorting through collected data to ascertain demographic profiles of panel members and related location/market information; analyzing usage behavior of panel members or aggregating groups of panelists, including but not limited to metrics such as share of messaging by voice, microbrowsing, SMS, e-mail and secure transactions; analyzing peak/off-peak usage patterns of panel members as well as average usage days per given period of time; analyzing telephony metrics including, for example, call duration, incoming versus outgoing calls, local versus long distance calls, voicemail functions, and digital versus analog mode; analyzing wireless data/internet metrics including, for example, reach (i.e., percentage of all users who visit a particular Website during a given time period), unique visitors (i.e., number of Web-active individuals who visited a particular site or web property within a given time frame), top sites or URLs visited during a given period of time, top sites bookmarked, counts of secure transactions placed during a given period of time, visits to non-Web digital media sites over a given period of time, click streams, advertisement views and responses; analyzing functionality of various wireless voice and data/internet services provided to users whereby number of hits per site or application versus total offerings may provide such indication; analyzing performance metrics related to the device, including but not limited to keypad operation, CPU processing capabilities, RF calibration, transmit and receive power, power consumption, battery charging, voltage and temperature; and analyzing performance metrics related to the operators' networks, including but not limited to RSSI, access failures, finger assignments, handoff and vocoder activity, transmit and receive power, frame error rates, dropped calls, blocked calls, connection speeds, internet or Web application download speeds, and secure transaction speeds. The generated information can be used to produce marketing information products, network performance products, device performance products, and integrated products that are useful to network operators, advertisers, content providers and producers of wireless voice and data services and products. At step 960, these end products (i.e., reports), which may take the form of hard copy and/or Web-based delivery, are stored at the database.

Usage, Audience, and Purchase Products

This competitive marketing information is mainly derived from the activity, usage, and behavior of the wireless device 100 users. Some general measurements include the numbers and demographics of users; the types of wireless devices and networks they use; sites they visit and bookmark; secure transactions they execute; advertisements they view/redeem. While these types of measurements provide much needed and valuable information as is, the ability of the data gathering software 110 to integrate time and location-based (i.e., environment driven) information with such user activity (i.e., event driven) measurements provides an unprecedented breadth of information never before available to the industry. The ability to understand where and when subscribers are using their wireless device 100 for wireless data and internet applications allows industry players to create novel marketing strategies that have not been possible in the wired internet space. Referring to FIGS. 10a and 10b, illustrative sample reports with respect to number of unique visitors to a site and total number and time of data sessions are shown. It should be noted that reports produced on wireless devices and networks via the system and related methods for measuring wireless device and network usage and performance metrics according to the invention have not been available to the industry.

Sample product reports on the following topics may be cut by time and location of user-based activity as well as trended over a period of time:

Data Traffic Report:
  Mix of messaging activity (or sessions) by SMS, e-mail, web visits, web downloads, m-commerce transactions
  Reach (i.e., percentage of all wireless internet users who visit a particular site during a given month)
  Unique visitors (i.e., number of wireless internet-active individuals who visited a particular site or web property within a given time frame; each panel member is represented once as a unique user)
  Top URLs visited (e.g., by subject, by portal, by domain, by individual sites with a domain, by group/entity, etc.)
  Top sites bookmarked (and whether these change over a period of time)
  Number of secure transactions completed
  Average unique web pages visited
  Average usage (days) per month
  Peak/off-peak usage periods
  Cuts by carrier, market, demographics Voice Statistics Report:
  Call frequency
  Local vs. long-distance
  Call duration
  Call origination
  Cuts by carrier, market, demographics Demographics Report:
  Age
  Gender
  Occupation
  Education
  Household composition—# of members, median income; homeowner/renter
  Geographic location
  Cut by user activity M-commerce Report:
  Secure transactions to identify consumer purchasing behavior
  Lookers/bookers
  Repeat visitors/purchasers
  Top products sold
  Revenue per site
  Reach
  Referring sites
  Cut by demographics Non-Web Digital Media Report:
  Activity on proprietary services such as AOL, Juno, PointCast
  Reach
  Referring sites
  Cut by demographics Advertising Report:
  Ads viewed/redeemed
  Top advertisers
  Top host sites
  Reach
  Cut by demographics
User Experience Report:
  Time to download home page of URL
  Time to complete secure transaction
  Browsers visitors are using
  Error log (i.e., times when site fails not related to ISP/backbone problems)
  Congestion periods
Technical Report:
  Device configuration & software applications
  Hardware components

Network/Device Performance Products

In addition to collecting event data based on consumer usage, it is an object of the invention to collect quality of service (QOS) data as well. According to the invention, QOS data may be captured by monitoring network parametric data and device parametric data based on the activities of the panel users. The ability to record real-time metrics on network and device performance driven by "live" user activity is unprecedented in the industry. Such data collected and processed via the data warehouse/mining application may yield reports on how the networks and devices are performing based on specific user event driven activities. Current drive tests and manufacturers' device tests do not have this capability (i.e., are performed independently of real-time consumer-based activity). Moreover, the invention allows for the QOS metrics to be correlated to time and location of user activity.

Sample product reports on the following topics may be cut by time and location of user-based activity as well as trended over a period of time:

Network Performance Report:
  Vocoder activity
  Frame error rates
  Closed loop power control
  Transmit/receive power
  Channel assignments
  Base station acknowledgement order
  Global service re-direct
  Hand-off activity
  Speed
  Access time
  Audio quality/MOS score
Device Performance Report:
  Battery measurements (voltage, temperature, charge time, power consumption, power amplifier)
  Idle vs. normal mode
  Analog vs. digital mode
  RF calibration
  Transmit/receive power
  Minutes used
  Finger assignments
  CPU measurements

Integrated Products

Event data, network parametric data, and device parametric data collected and processed may be interpreted not only on a stand-alone basis but also integrated with one another to provide more robust data. To date, this has not been possible since industry players have had to source the various pieces of information from different parties; even then, the data was collected from disparate devices during different time periods. Event data, network parametric data and device parametric data advantageously can be collected together in real-time from the same wireless device 100, allowing for directly comparable data that, when viewed in concert, provides a richer set of information. Moreover, some or all of these data can be collected in concert with location information and time information which indicate the time and place of device activity. For example, a problem detected in the network may be correlated to specific user activity in a particular location and time.

In order to generate the most accurate and representative reports, a wireless device 100 equipped with the data gathering software 110 is to be distributed and used by a targeted group of wireless communications services users to collect statistically representative data. A statistical sampling methodology will be employed so that this panel of users may represent a broader audience and typify various demographic profiles. The panel will also be constructed to allow for national, regional, and market level reporting. Participation in the panel will be on an opt-in, incentive-driven basis whereby panel members agree to have their wireless voice and data/internet usage captured via the data gathering software 110 resident on their wireless device 100. While most of the monitoring process will require no involvement on the user's part and will remain transparent to the user, each participant will agree to disclose basic user profile information upon commencement of activity and upon certain other conditions.

Figure 12:
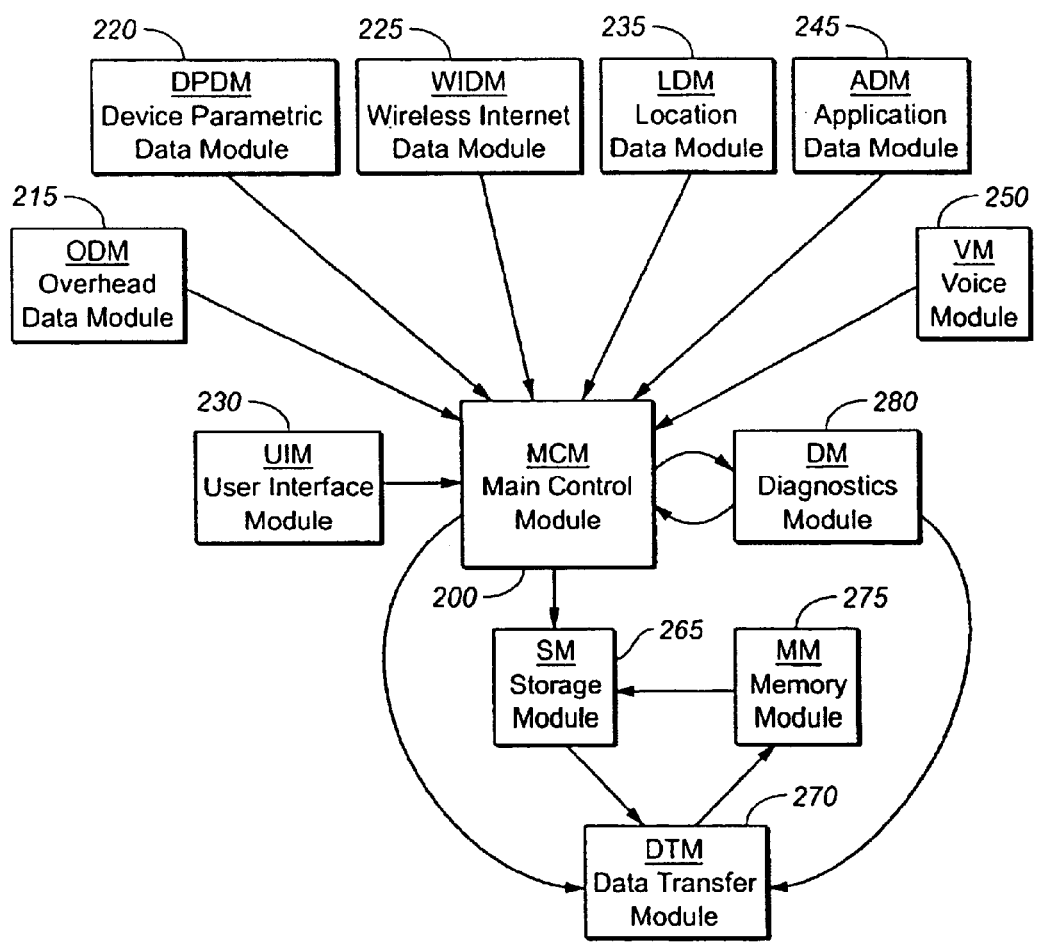
FIG. 12, shows an illustrative representation of the logical relationships among the modules of FIG. 2.

Referring to the illustrative drawing of FIG. 12, there is shown a pictorial representation of the logical relationships among the modules of FIG. 2. In the illustrative drawing, the MCM 200 exercises control over the operation of the other modules. In a current embodiment of the invention, the data gathering modules (ODM 215, DPDM 220, WIDM 225, LDM 235, ADM 245, and VM 250, are implemented in computer software using system traps. Specifically, each respective data gathering module operates system traps associated with one or more respective computer software controlled functions. Each respective data gathering module gathers respective data in response to a function call to its associated function or functions. In operating as a system trap, each respective data gathering module intercepts calls to its associated function and gathers prescribed data. The gathered data, for example, may relate to the function itself, to device parametric data, time, location or other information prescribed to be gathered in association with the called function.

The MCM 200 also controls access to the storage module 265 which serves to temporarily store data gathered by the respective data gathering modules, if such temporary storage is required. MCM 200 also controls the operation of the data transfer module 270 which serves to transfer gathered data to the control center 120. In a present embodiment, the data transfer module 270 can transfer to the control center 120 gathered data that has been temporarily stored by storage module 265. Alternatively, the data transfer module 270, under control of MCM 200, can directly transfer data gathered by any of the data gathering modules directly to the data transfer module 270 without the need for temporarily storage of such gathered data by the storage module 265. For instance, the data transfer module 270, under control of MCM 200, can directly transfer data gathered by user interface data module 230 or wireless internet data module 225 or diagnostics module 280 directly to the data transfer module 270 without the need for temporarily storage of such gathered data by the storage module 265.

In a present embodiment, logical relationships among the data gathering modules and the MCM 200 are achieved by inserting system traps on function calls associated with respective data gathering modules. When a function call associated with a respective data gathering module is made, the call is intercepted and the MCM 200 which invokes a data gathering module associated with the called function. It should be appreciated that although the drawings of FIG. 12 illustrate MCM 200 as a distinct control module, in a present embodiment, MCM 200 is implemented by a native operating system of a wireless device.

Figure 13:
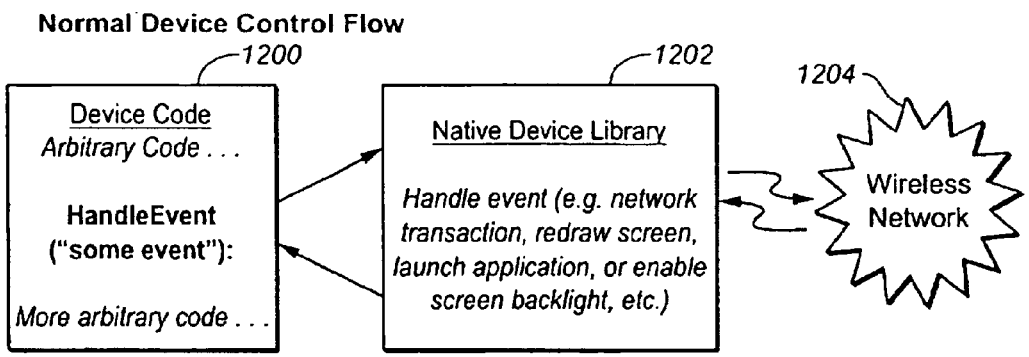
FIG. 13, shows an illustrative generalized drawing of computer software control flow in a wireless device in the course of a typical function call in which there is no data gathering.

Referring to the illustrative drawing of FIG. 13, there is shown a generalized example of computer software control flow in a wireless device in the course of a typical function call in which there is no data gathering. The reason for including this example is to better illustrate the differences between an embodiment of the present invention and the relevant art. In this example, a wireless device executes a main computer program code process 1200. The exact nature of the process is unimportant to this example. The process might involve voice communication or email messages or network communications, for instance. At various points in the execution of the main process 1200, operating system calls are made to functions performed by a native facility of the wireless device such as a native device library module. The exact nature of the operating system call is unimportant. During such function calls, control is temporarily passed to such native facility. For instance, the process code 1200 in the example includes the hypothetical expression "HandleEvent[name of event]" which directs the process 1200 to call native device library 1202 which includes a computer program code process which processes the named event. Control is temporarily passed to the called library code process 1202, which controls performance of the called function. There are many different types of functions that can be called. For instance, the called function might involve a network transaction, redrawing a screen, launching an application or a enabling screen backlight. Moreover, the called function might involve some wireless communication process represented by the network cloud labeled 1204. When the processing by library module 1202 is complete, control is returned to computer program 1200, which proceeds to process the next series of computer program code. It will be appreciated that the processing of code 1200 may involve numerous function calls to other code modules, although only the call to module 1202 is shown in this illustrative example.

Figure 14:
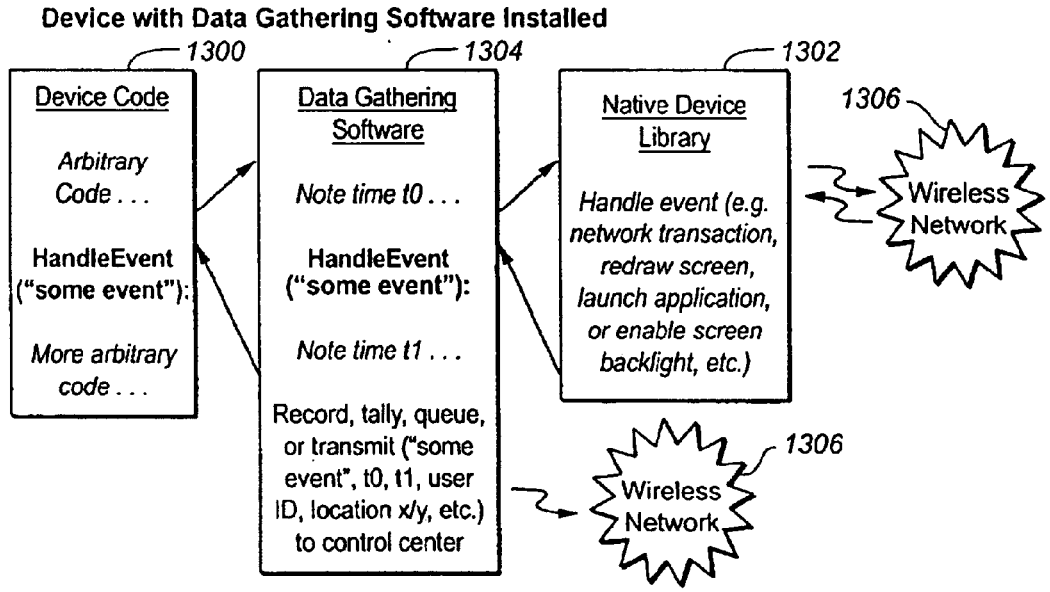
FIG. 14, shows a generalized drawing of computer software control flow of data gathering associated with a function call (or event) in accordance with a presently preferred embodiment of the invention.

Referring to the illustrative drawing of FIG. 14, there is shown a generalized example of computer software control flow of data gathering associated with a function call (or event) in accordance with a presently preferred embodiment of the invention. A main computer program process 1300 runs on a wireless device (not shown). The exact nature of the main process 1300 is unimportant to this example. However, like process 1200 described in relation to FIG. 13, the process 1300 might, for example, involve voice communication or email messages or network communications, for instance. At various points in the execution of the process 1300, operating system calls are made to one or more functions performed by native facilities of the wireless device such as a native device library module 1302. The exact nature of such operating system calls are unimportant. For instance, the illustrative process code 1300 in the example in FIG. 14 includes the hypothetical expression "HandleEvent[name of event]" which directs the process 1300 to call native device library 1302 which includes a computer program code process running on the device which processes the named event. The event, for instance, might be setting up a voice call, launching an application, establishing a network connection or searching the internet. In accordance with a present embodiment of the invention, data gathering software 1304 running on the device intercepts the call to the native device library 1302. The data gathering software 1304 gathers prescribed data associated with the called function. For instance, such prescribed data can include data relating to the function itself or data passed within the call such as names of applications or URL addresses, device parametric data, time information and location information. The data gathering software may use native or custom API (application programming interface) calls to obtain the prescribed data. The data gathering software process 1304 passes the call to the native device library 1302 which processes the call. The called function might involve some wireless communication process represented by the network cloud labeled 1306. When the native device library 1302 has completed processing of the called function, control is passed back to the data gathering software 1304 which may gather additional data such as the elapsed time, for example. The data gathering software records, tallies or queues the gathered data for temporary storage by the storage module 265 or for direct transfer to the data transfer module 270. The data gathering software comprises one of the ODM 215, DPDM 220, WIDM 225, LDM 235, ADM 245, and VM 250 described above.

It will be appreciated that in a present embodiment of the invention, gathered data is transferred immediately to the control center 120 if an appropriate connection, wireless or wired, is available. Two examples of methods are to encode the data into an email and send it, or to send the data via and HTTP post. Gathered data can be sent to the data transfer module where the DTM can prepare and send the data immediately. Alternatively, the gathered data can be temporarily stored by the storage module 265 prior to transmission.

As yet another alternative, some of the gathered information may be sent to the control center 120 immediately while other gathered information is stored temporarily. For example, situations may arise where a user is in a poor coverage area where network latency is high or when the gathered data is of sizeable volume where attempting to send the gathered data may reduce the quality of the consumer experience using the device. In these situations the data gathering software may immediately transfer some of the data and store other pieces of data. In another scenario, for example, location data collected for every event may be compared to location data of previous events and only sent with the gathered data immediately if the location data has changed. When the data gathering software 1304 has gathered the prescribed data, control is returned to the main process 1300.

Figure 15:
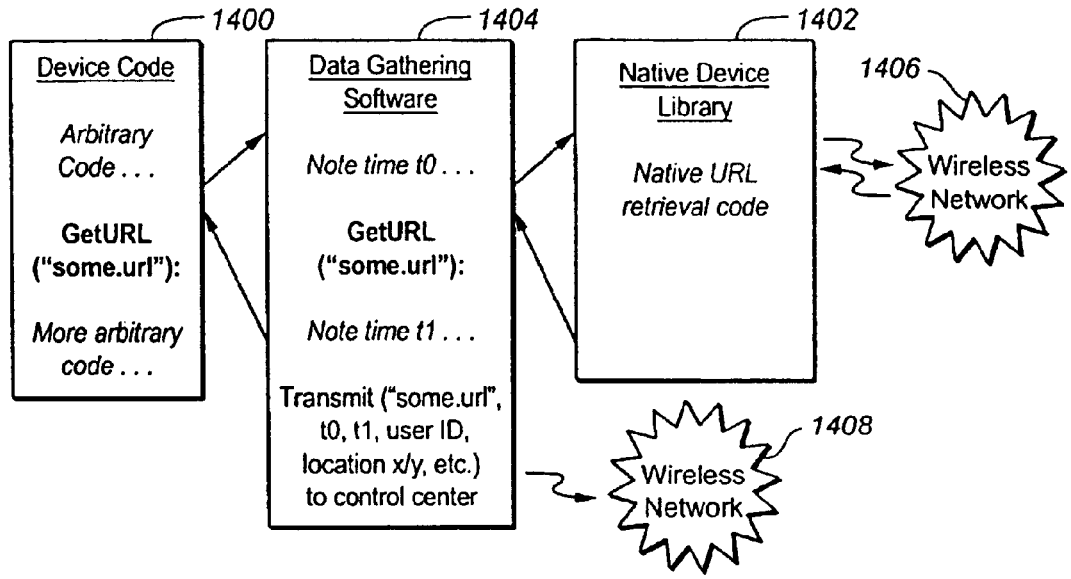
FIG. 15, shows a generalized drawing of computer software control flow of data gathering associated with a function call (or event) involving a user request for network accessible information in accordance with a presently preferred embodiment of the invention.

Referring to the illustrative drawing of FIG. 15, there is shown a generalized example of computer software control flow of data gathering associated with a function call (or event) involving a user request for network accessible information in accordance with a presently preferred embodiment of the invention. A main computer program process 1400 shown in FIG. 15 is analogous to processes 1200 and 1300 in FIGS. B and C, respectively. The main process 1400 runs on a wireless device (not shown), and the exact nature of the process 1400 is unimportant to this example. At some point in the execution of the process 1400, an operating system call is made to a function which gathers network accessible information. In this example, the network is the internet, and the information is designated by a uniform resource locator (URL). The function of retrieving the information designated by the URL is performed by a native facility of the wireless device such as a native device library module. For example, the illustrative main process code 1400 in the example in FIG. 15 includes the hypothetical expression "Get[identify some URL]" which directs the process 1400 to call native device library 1402 which includes a computer program code process running on the device which serves to retrieve the network accessible information designated by the identified URL.

In accordance with a present embodiment of the invention, data gathering software 1404 running on the device intercepts the call to the native device library 1402. The data gathering software 1404 gathers prescribed data associated with the called function. For instance, such prescribed data can include data relating to the function itself or data passed within the call such as names of applications or URL addresses, device parametric data, time information and location information. The data gathering software may use native or custom API (application programming interface) calls to obtain the prescribed data. The data gathering software process 1404 passes the call to the native device library 1402 which retrieves network accessible information associated with the URL. The called function might involve some wireless communication process represented by the network cloud labeled 1406. When the native device library 1402 has completed processing of the called function, control is passed back to the data gathering software 1404 which may gather additional data such as the elapsed time, for example. The data gathering software 1404 transfers the gathered data including the information designating the desired network accessible information (i.e., the URL) directly to the control center 120 via the data transfer module 270.

Note that it is possible to immediately send such information to the control center 120 since network communications (represented by network clouds 1406 and 1408) established to retrieve the requested network accessible information also can be used to immediately transfer the gathered data to the control center 120 without the need for storage by storage module 265. Alternatively, the gathered data might be stored temporarily by the storage module 265 prior to transmission to the control center 120. As yet another alternative, some of the gathered software may be sent to the control center 120 immediately while other data is stored temporarily. When the data gathering software 1404 has gathered the prescribed data, control is returned to the main process 1400.

Figure 16:
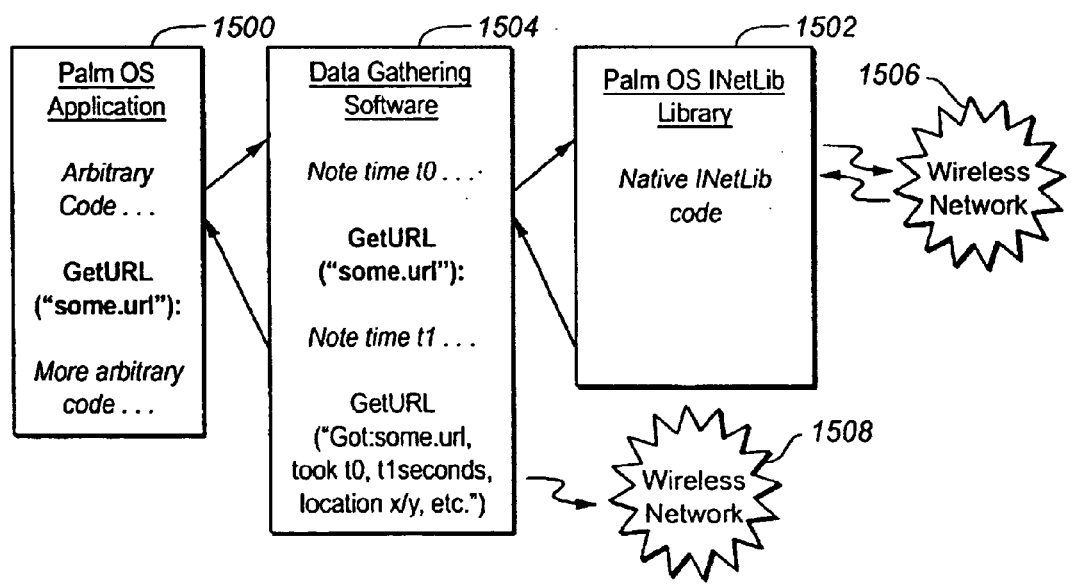
FIG. 16, shows a generalized drawing of computer software control flow of data gathering associated with a user request for network accessible information in a device with a Palm Operating System (Palm OS) implementation of a presently preferred embodiment of the invention.

Referring to the illustrative drawing of FIG. 16, there is shown a generalized example of computer software control flow of data gathering associated with a user request for network accessible information in a device with a Palm Operating System (Palm OS) implementation of a presently preferred embodiment of the invention. The process illustrated with reference to FIG. 16 is directly analogous to the process illustrated with reference to FIG. 15. One difference is that in FIG. 16, the hypothetical "Get[identify some URL]" expression in the main process 1500 results in a call to the Palm OS INetLIB library 1502. The data gathering software 1504 intercepts the call, and gathers the prescribed data and passes the call to the Palm OS INetLIB library 1502 which processes the call by requesting the information form the network as indicated by the network cloud 1506. When the Palm OS INetLIB library 1502 completes its processing, control is passed to the data gathering software 1504 which may gather additional prescribed data. The data gathering software 1504 transfers the gathered data including the URL immediately to the control center 120 as indicated by the network cloud 1508. This alternate embodiment also employs what the applicant refers to as "URL forking" described above. Alternatively, the gathered data may be temporarily stored by storage module 265 prior to transmission to the control center 120. When the data gathering software 1504 has gathered the prescribed data, control is returned to the main process 1500.

Figure 17:
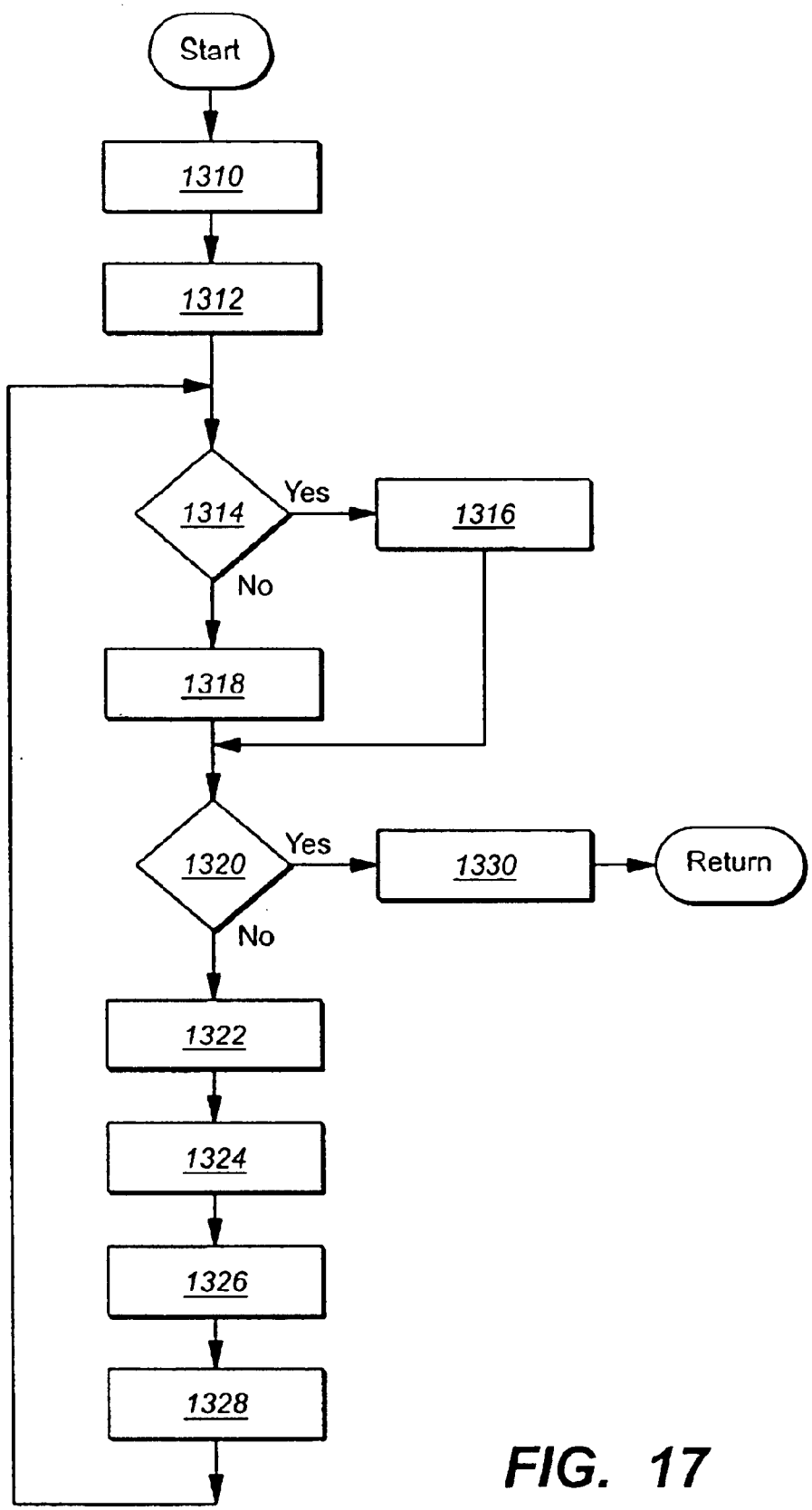
FIG. 17 shows an illustrative flow diagram of the operation of the data gathering software of FIG. 14 intercepting a call from the main process to a device library and gathering prescribed data in accordance with an embodiment of the invention.

The illustrative drawing of FIG. 17 shows a flow diagram of the operation of the data gathering software 1304 of FIG. 14 intercepting a call from the main process 1300 to the device library 1302 and gathering prescribed data. In step 1310, the data gathering software 1304 intercepts a call by the main program 1300 to the native device library 1302. In step 1312, the data gathering software gathers the prescribed data. The data to be gathered, for example, may involve gathering an identification of the called function (or event). For instance, if the function involves launching an application, then the data gathering software may record an identification of the launched application. If the event involves a user's pressing a particular button, then an identification of the button may be recorded. The prescribed data also may include the date and time of the event as well as the location of the device at the time of the event. The prescribed data also may include device parametric data such as battery power level or received signal strength, for example. In decision step 1314, a determination is made as to whether there is a communication link between the device and the control center 120 that will permit immediate transfer of the gathered data to the control center 120. If there is such a connection, then the data may be transferred immediately to the control center 120 via the data transfer module 270, in step 1316. If there is no such connection immediately available, then in step 1318, the gathered data may be stored by the storage module 265 until it can be transferred later by the data transfer module 270 to the control center 120.

In decision step 1320, the data gathering software 1304 determines whether the device library 1302 has processed the call yet. If the call has not yet been processed, then in step 1322, the data gathering software 1304 passes control to the called device library 1302, and the device library processes the call. Note that the some or all of the actual data gathering, transferring or storing by the data gathering software 1304 may be delayed until after the device library 1302 has completed its processing of the call. This delay may be imposed so that the data gathering transferring and storing efforts do not degrade device performance as perceived by the device user. In step 1324, when the device library 1302 has finished processing, control is passed from the device library 1302 to the data gathering software 1304. In step 1326, the data gathering software gathers any additional prescribed data. In general, such additional prescribed data will include the date and time of completion of the processing by the device library 1302.

In step 1328, device physical location is determined as described below. The device physical location also constitutes gathered data. One or more than one approach to determining the geographic location of a mobile device when data is gathered by a data gathering module. For instance, the data gathering module may issue a call to the device operating system requesting the base station identification for the base station with which the device currently has a connection. Alternatively, the data gathering module may issue a call to the device operating system requesting identification of the cell site location or the cell tower with which the device currently is in communication. The cell site information may be appropriate for CDMA connections during soft handoffs, for example. As yet another alternative, the data gathering module may issue a call to the device operating system requesting the base station zip code information for the base station with which the device currently has a connection. As still another alternative, the data gathering module may make a request for a global positioning system (GPS) fix on the device's geographic location at the time of the data gathering. It will be appreciated that a mobile device may attempt more than one of these approaches to determining geographic location.

Alternatively, location data can be gathered in step 1312 before control is passed to the device library 1302.

In decision step 1314, a determination is again made as to whether there is a communication connection that can immediately transfer gathered data from the device to the control center 120. If there is such a connection, then in step 1316, the data can be transferred immediately to the control center via the data transfer module 270. If there is no such connection available, then in step 1318, storage module 265 can store the gathered data. In decision step 1320 a determination is again made as to whether device library 1302 has completed processing of the call. This time it has, and therefore, in step 1330 the data gathering software passes control back to the main program 1300.

It will be appreciated that in an alternative embodiment, some gathered data may be returned immediately to the control center 120 while other data is stored temporarily by the storage module 265. For instance, if there is a wireless connection between the device and the control center 120 some but not all of the gathered data might be transferred via the wireless connection.

It should also be appreciated that the present invention is intended to encompass the situation in which function calls are cascaded. For instance, a first called device library element might in turn call a second device library element. The second device library element might in turn call a third device library element. One skilled in the art will appreciate that each such function call might invoke another data gathering software instance to gather data associated with such call. Thus, there may be multiple data gathering software modules or instances of modules active at the same time intercepting calls and gathering data in the event of an occurrence of such a cascading of function calls.

The operation of the data gathering software 1404 of FIG. 15 and of data gathering software 1504 of FIG. 16 are generally the same as that of data gathering software 1304 of FIG. 14 except that in the cases of the data gathering software 1404 and 1504 of FIGS. D and E, there almost certainly will be a communication connection that permits the immediate transfer of gathered data from the device to the control center 120. Hence, in the case of data gathering software 1404 and 1504, decision step 1314 virtually always should result in a selection of step 1316 in which there is an immediate transfer of gathered data to the control center 120. It will be appreciated that even an immediate transfer of gathered data to the control center 120 may requires at least momentary storage of the gathered data by the device. For example, such storage may be necessary in order to properly configure or packetize the data for transfer, or the data may be buffered temporarily as it queued with other data awaiting its turn for transmission. Such momentary storage may take place in registers or in main memory. It may be necessary to temporarily store in main memory, for example, because the device operating system may use all of the available registers for other processes.

One embodiment of the invention involves transfer of the gathered data via email. The gathered data is packaged in an email message format and placed in a user's email outbox in the device. It will be appreciated that such embodiment is a hybrid of the embodiment illustrated in FIG. 17. If there is an appropriate network connection immediately available, wireless or wired, one or more email messages containing the gathered data can be sent immediately to the control center 120 per step 1316 of FIG. 17. If there is not an appropriate network connection immediately available the one or more emails sit in the outbox until a network connection becomes available per step 1318 of FIG. 17.

Another embodiment of the invention uses a "hotsync" session to transfer gathered data from the mobile device to a personal computer or other device having access to a network. Alternatively, a hotsync session could be used to send gathered data directly to the control center too, essentially bypassing the local computer. A hotsync session involves an interconnection of a client device with a host device such that the client and host can update their respective electronic memories to bring them into synchronization. For instance, while a mobile device (client) was in use and untethered from a networked personal computer (host), the user may have modified some of his or her personal information such as an electronic rolodex. Conversely, while the mobile device was in use and untethered from the personal computer, new versions of software to be delivered to the mobile device may have been delivered to the host. During a hotsync session, for example, the new personal information may be transferred from mobile device to personal computer, and the new software version may be transferred from personal computer to mobile device. For instance, in a present embodiment involving a device with a Palm Operating System (Palm OS), a conduit is established during a portion of a hotsync session by which the gathered data is transferred from the mobile device to the personal computer or directly to the control center. For instance, such hotsync conduit might place the gathered data in an email in the personal computer to be sent over a wired or wireless network to the control center 120. Alternatively, the hotsync session may cause the gathered data to be placed in main memory of the personal computer, such as its hard drive, so that it later may be transferred to a portable memory medium such as a diskette for physical delivery to the control center 120.

Yet another embodiment of the invention transfers gathered data from the mobile device to a local personal computer or server or other networked device via a short range wireless connection such as that compliant with the Bluetooth or 802.11b standard. The mobile device sends the gathered data to the personal computer or server or other networked device which, in turn, sends it to the control center 120. No hotsync is required. Also, if the network connection is available through either of these standards, a direct transmission can be made to the control center.

The control center 120 is operatively connected to a network on which gathered information is transmitted from mobile devices to the control center 120. In a present embodiment, the control center 120 is connected to the internet. For example, the control center 120 may be implemented as a webserver listening on port 80. Alternatively, for example, the control center 120 can be implemented as a proxy server or as an email server. The control center listens on the network for device messages directed to it.

It will be appreciated from the description above that the control center 120 comprises one or more computers in one or more locations operatively connected to a communications system whereby gathered data can be transferred to such control center. The one or more computers of the control center 120 operate under control of computer software which, in accordance with the present invention, causes such computers to collect the information gathered by the data gathering software of the wireless mobile devices. In essence, the data gathering software and the collection software work together as a system. The data gathering software controls gathering of data by the wireless mobile devices, and the collection software controls collection of the gathered data by the control center computers 120. The wireless mobile device merely service as a source of data to be gathered. While the control center merely serves as the destination where such data is collected. The data gathering software and the collection software cooperation to first gather and then collect such data.

The collection software causes the control center 120 to receive gathered data transmitted by a mobile device. The gathered data may be transmitted directly to the control center 120 over the network or it may be transmitted indirectly through a hotsync session or a short range wireless connection. The collection software causes the control center 120 to note the actual date and time at which the gathered data is received from the device. It will be appreciated that data may be gathered by wireless devices located in different geographic locations. Therefore, it may be necessary to normalize the time at which data is gathered to a standard time such as Greenwich Mean Time (GMT). The control center may in some situations determine the actual time (e.g. GMT) of an event using gathered location information. For instance, although time information may be collected from a device clock as an event occurs, the device clock itself might not be accurate. Thus, device clock time information might not be valuable. However, the collection software can cause the control center 120 to use other time information that is more accurate to correct for the inaccuracies of the device clock. For instance, certain wireless protocols automatically include time information in certain packets (e.g., CDMA). Thus, accurate time information can be acquired from certain wireless packets. Also, the control center can time stamp gathered data with an accurate time of receipt from a wireless device. The time stamp information or the wireless packet time information can be used as a basis for correcting for errors in the device time. Moreover, once an accurate determination of the time (e.g., GMT) at which an event occurred has been made, location information can be used to determine the local time at the location of the device when the event occurred. The collection software causes the control center 120 to insert the gathered data, which ordinarily will include geographic location information, and the calculated time into a central log. The collection software then causes the control center to return to listening on the network 1602.

It will be appreciated that, although the embodiment explained with reference to FIGS. 12–17 employs system traps to gathered prescribed data, the invention can be implemented without the use of traps. For instance, the data gathering functions can be built into the operating system of a mobile device or into the web browser of a mobile device. In either of those cases there would very well be no need to trap a function call in order to gather data if the function itself gathered the desired data. For instance, as yet another alternative, the operating system or browser might make specific calls to gather prescribed data upon the occurrence of prescribed events. Thus, for example, the operating system or web browser might be implemented such that whenever a new application is launched, one or more procedure calls are made to obtain the location of the device at the time of such launch and to accomplish a transfer of the application name and such location to the control center 120. Basically, system traps are used in the illustrated embodiment because the data gathering functionality has been added to the functionality of conventional devices. Therefore, the invention is not intended to be limited to the use of system traps.

While the present invention has been particularly described with respect to the illustrated embodiments, it will be appreciated that various alterations, modifications and adaptations may be made based on the present disclosure, and are intended to be within the scope of the present invention. While the invention has been described in connection with what are presently considered to be the most practical and preferred embodiments, it is to be understood that the present invention is not limited to the disclosed embodiment but, on the contrary, is intended to cover various modifications and equivalent arrangements included within the scope of the appended claims.

What is claimed is:

1. A mobile wireless device comprising:
   electronic memory encoded with,
      data gathering software which gathers information pertaining to device usage from actual use of the mobile wireless device by a user, the gathered information including event data and association of respective events with respective location information indicative of device location during the occurrences of such respective events; and
      data transfer software which provides the gathered information for transmission.

2. The mobile wireless device of claim 1 wherein the gathered information further includes mobile device parametric data.

3. The mobile wireless device of claim 1 wherein the gathered information further includes network parametric data.

4. The mobile wireless device of claim 1 wherein the gathered information further includes mobile device parametric data and network parametric data.

5. The mobile wireless device of claim 1 wherein the gathered information further includes association of respective events with respective temporal information indicative of time of the occurrence of such respective events.

6. The mobile wireless device of claim 1 wherein data transfer software provides the gathered information for wireless transmission.

7. The mobile wireless device of claim 1 wherein data transfer software provides the gathered information for internet transmission.

8. The mobile wireless device of claim 1 wherein data transfer software provides the gathered information for hotsync transmission.

9. A mobile wireless device comprising:
   electronic memory encoded with,
      data gathering software which gathers information pertaining to network performance from actual use of the mobile wireless device by a user, the gathered information including network parametric data and association of respective network parametric data with respective location information indicative of network parameters at such respective locations; and
      data transfer software which provides the gathered information for transmission.

10. The mobile wireless device of claim 9 wherein the gathered information further includes association of respective network parametric data with respective temporal information indicative of time of the gathering of such respective network parametric data.

11. The mobile wireless device of claim 9 wherein the gathered information further includes mobile device parametric data.

12. A method of gathering information concerning wireless mobile device usage comprising:

prescribing a panel of respective users of respective mobile wireless devices;

wherein each respective mobile device includes electronic memory encoded with, data gathering software which gathers information pertaining to device usage from actual use of the respective mobile wireless devices from the panel of respective users, the gathered information including event data and association of respective events with respective location information indicative of device location during the occurrences of such respective events; and data transfer software which provides the gathered information for transmission; and collecting the gathered information provided by respective mobile devices of said panel of users.

13. The method of claim 12 wherein the gathered information further includes mobile device parametric data.

14. The method of claim 12 wherein the gathered information further includes network parametric data.

15. The method of claim 12 wherein the gathered information further includes association of respective events with respective temporal information indicative of time of the occurrence of such respective events.

16. A method of gathering information concerning wireless mobile device usage comprising:

prescribing a panel of respective users of respective mobile wireless devices;

wherein each respective mobile device includes electronic memory encoded with, data gathering software which gathers information pertaining to network performance from actual use of the mobile wireless devices by the panel of respective users, the gathered information including network parametric data and association of respective network parametric data with respective location information indicative of network parameters at such respective locations; and data transfer software which provides the gathered information for transmission; and collecting the gathered information provided by respective mobile devices of said panel of users.

17. The mobile wireless device of claim 16 wherein the gathered information further includes association of respective network parametric data with respective temporal information indicative of time of the gathering of such respective network parametric data.

18. The method of claim 16 wherein the gathered information further includes mobile device parametric data.

19. A system for collecting information by at least one control center concerning wireless mobile device usage comprising:

respective electronic memories of respective mobile devices of panelists of a panel comprised of respective mobile device users, the respective electronic memories respectively encoded with respective computer software;

wherein the respective computer software comprise, data gathering software which gathers information pertaining to device usage from actual use of the respective mobile wireless devices from the panel of respective users, the gathered information including event data and association of respective events with respective location information indicative of device location during the occurrences of such respective events; and data transfer software which provides the gathered information for transmission; and an electronic storage medium encoded with computer software to control collection by the at least one control center of respective gathered information respectively provided by respective mobile devices of said panel of users.

20. The system of claim 19 wherein the gathered information further includes association of respective event data with respective temporal information indicative of time of the gathering of such respective event data.

21. The system of claim 19 wherein the gathered information further includes mobile device parametric data.

22. A system for collecting information by at least one control center concerning wireless mobile device usage comprising:

respective electronic memories of respective mobile devices of panelists of a panel comprised of respective mobile device users, the respective electronic memories respectively encoded with respective computer software wherein the respective computer software comprise, data gathering software which gathers information pertaining to network performance from actual use of the respective mobile devices by the respective mobile device users, the gathered information including network parametric data and association of respective network parametric data with respective location information indicative of network parameters at such respective locations; and data transfer software which provides the gathered information for transmission; and an electronic storage medium encoded with computer software to control collection by the at least one control center of respective gathered information respectively provided by respective mobile devices of said panel of users.

23. The system of claim 22 wherein the gathered information further includes association of respective network parametric data with respective temporal information indicative of time of the gathering of such respective network parametric data.

24. A mobile wireless device comprising:

electronic memory encoded with, data gathering software which gathers information pertaining to device usage and network performance from actual use of the mobile wireless device by a user, the gathered information including event data and network parametric data and association of respective events with respective location information indicative of device location during the occurrences of such respective events; and data transfer software which provides the gathered information for transmission.

25. The mobile wireless device of claim 24 wherein the gathered information further includes mobile device parametric data.

26. The mobile wireless device of claim 24 wherein the gathered information further includes association of respective events with respective temporal information indicative of time of the occurrence of such respective events.

27. A method of gathering information concerning wireless mobile device usage comprising:
   prescribing a panel of respective users of respective mobile wireless devices;
   wherein each respective mobile device includes electronic memory encoded with,
      data gathering software which gathers information pertaining to device usage and network performance from actual use of the respective mobile wireless devices from the panel of respective users, the gathered information including event data and network parametric data and association of respective events with respective location information indicative of device location during the occurrences of such respective events; and
      data transfer software which provides the gathered information for transmission; and
   collecting the gathered information provided by respective mobile devices of said panel of users.

28. The method of claim 27 wherein the gathered information further includes mobile device parametric data.

29. The method of claim 27 wherein the gathered information further includes association of respective events with respective temporal information indicative of time of the occurrence of such respective events.

30. A system for collecting information by at least one control center concerning wireless mobile device usage comprising:
   respective electronic memories of respective mobile devices of panelists of a panel comprised of respective mobile device users, the respective electronic memories respectively encoded with respective computer software;
   wherein the respective computer software comprise,
      data gathering software which gathers information pertaining to device usage from actual use of the respective mobile wireless devices from the panel of respective users, the gathered information including event data and network parametric data and association of respective events with respective location information indicative of device location during the occurrences of such respective events; and
      data transfer software which provides the gathered information for transmission; and
   an electronic storage medium encoded with computer software to control collection by the at least one control center of respective gathered information respectively provided by respective mobile devices of said panel of users.

31. The system of claim 30 wherein the gathered information further includes mobile device parametric data.

* * * * *